United States Patent
Park et al.

(10) Patent No.: US 12,362,613 B2
(45) Date of Patent: Jul. 15, 2025

(54) MOTOR HAVING A FIRST ROTOR CORE CONTAINING MAGNETS AND A SECOND ROTOR CORE MADE OF MAGNETIC MATERIAL

(71) Applicant: LG ELECTRONICS INC., Seoul (KR)

(72) Inventors: Chisung Park, Seoul (KR); Sangjoon Eum, Seoul (KR); Gyujong Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 158 days.

(21) Appl. No.: 18/235,017

(22) Filed: Aug. 17, 2023

(65) Prior Publication Data

US 2023/0402884 A1   Dec. 14, 2023

Related U.S. Application Data

(62) Division of application No. 17/039,463, filed on Sep. 30, 2020, now Pat. No. 11,777,347.

(30) Foreign Application Priority Data

Jan. 8, 2020   (KR) .......................... 10-2020-0002728

(51) Int. Cl.
*H02K 1/276* (2022.01)
*F04B 17/03* (2006.01)
(Continued)

(52) U.S. Cl.
CPC ............. *H02K 1/278* (2013.01); *F04B 17/03* (2013.01); *F04B 35/04* (2013.01); *F04B 39/14* (2013.01);
(Continued)

(58) Field of Classification Search
CPC .......... H02K 1/278; H02K 1/28; H02K 15/03; H02K 1/276; Y10T 29/49012;
(Continued)

(56) References Cited

U.S. PATENT DOCUMENTS 5,397,951 A * 3/1995 Uchida ................. H02K 1/278
                                                       310/91
5,962,944 A 10/1999 Narita
(Continued)

FOREIGN PATENT DOCUMENTS

EP   1158652   11/2001
EP   3282564    2/2018
(Continued)

OTHER PUBLICATIONS

European Search Report dated Apr. 9, 2021 issued in Application No. 20205602.4.
(Continued)

*Primary Examiner* — Peter J Bertheaud
(74) *Attorney, Agent, or Firm* — KED & ASSOCIATES

(57) ABSTRACT

An electric motor and a compressor having an electric motor. The electric motor may include a stator, and a rotor provided with a rotational shaft, a rotor core coupled to the rotational shaft, and permanent magnets coupled to the rotor core. The rotor core may include a first core to which the permanent magnets may be coupled, and a second core made of a magnetic material and coupled to an end of the first core in an axial direction. The second core may have outer surfaces disposed inside of extension lines extending in the axial direction from inner surfaces of the permanent magnets.

11 Claims, 28 Drawing Sheets

(51) Int. Cl.

| | |
|---|---|
| *F04B 35/04* | (2006.01) |
| *F04B 39/14* | (2006.01) |
| *F04C 23/00* | (2006.01) |
| *F04C 29/00* | (2006.01) |
| *F04D 25/06* | (2006.01) |
| *F04D 29/40* | (2006.01) |
| *F25B 31/02* | (2006.01) |
| *H02K 1/278* | (2022.01) |
| *H02K 1/28* | (2006.01) |
| *H02K 15/03* | (2025.01) |
| *H02K 21/14* | (2006.01) |

(52) U.S. Cl.
CPC ........ *F04C 23/008* (2013.01); *F04C 29/0085* (2013.01); *F04D 25/06* (2013.01); *F04D 29/403* (2013.01); *H02K 1/276* (2013.01); *H02K 1/28* (2013.01); *H02K 15/03* (2013.01); *H02K 21/14* (2013.01); *F04C 2230/60* (2013.01); *F25B 31/023* (2013.01); *Y10T 29/49012* (2015.01)

(58) Field of Classification Search
CPC .......... F04B 35/04; F04B 17/03; F04B 39/14; F04C 23/008; F04C 29/0085; F04C 2230/60; F04D 25/06; F04D 29/403
See application file for complete search history.

(56) References Cited

U.S. PATENT DOCUMENTS

| | | | |
|---|---|---|---|
| 7,866,957 | B2 | 1/2011 | Akashi |
| 9,800,105 | B2 | 10/2017 | Nigo |
| 10,050,481 | B2 | 8/2018 | Miyashita |
| 2006/0017342 | A1* | 1/2006 | Park ...................... H02K 1/278 |
| | | | 310/156.19 |
| 2008/0298986 | A1 | 12/2008 | Ishida |
| 2012/0055193 | A1 | 3/2012 | Fukasaku |
| 2016/0028278 | A1 | 1/2016 | Baba et al. |
| 2018/0048201 | A1 | 2/2018 | Schwarz |

FOREIGN PATENT DOCUMENTS

| | | |
|---|---|---|
| EP | 3 780 350 | 2/2021 |
| JP | 2010-206884 | 9/2010 |
| JP | 4599881 | 12/2010 |
| JP | 2013-099105 | 5/2013 |
| JP | 2018-196320 | 12/2018 |
| KR | 10-1094599 | 12/2011 |
| KR | 10-2012-0081491 | 7/2012 |
| KR | 10-1189074 | 10/2012 |

OTHER PUBLICATIONS

Korean Office Action issued in Application No. 10-2020-0002728 dated Jun. 15, 2021.
Korean Notice of Allowance issued in Application No. 10-2020-0002728 dated Sep. 2, 2021.
European Search Report issued in 20 205 602.4 dated Apr. 29, 2022.
U.S. Office Action issued in U.S. Appl. No. 17/039,463 dated Mar. 15, 2023.

* cited by examiner

MOTOR HAVING A FIRST ROTOR CORE CONTAINING MAGNETS AND A SECOND ROTOR CORE MADE OF MAGNETIC MATERIAL

CROSS-REFERENCE TO RELATED APPLICATION(S)

This application is a Divisional Application of prior U.S. patent application Ser. No. 17/039,463 filed Sep. 30, 2020, which claims the benefit of the earlier filing date and the right of priority to Korean Patent Application No. 10-2020-0002728, filed in Korea on Jan. 8, 2020, the contents of which is incorporated by reference herein in its entirety.

BACKGROUND

1. Field

An electric motor and a compressor having an electric motor are disclosed herein.

2. Background

Compressors including a compression unit to compress a refrigerant and an electric motor to provide a drive force to the compression unit are well known. Compressors may be configured as hermetic compressors having a case with an enclosed space therein.

Recently, according to a trend of miniaturization of hermetic compressors, a study on miniaturization to increase power density per unit volume of an electric motor has been conducted. However, in such a compressor equipped with a related art electric motor, an inertial force decreases when the electric motor is miniaturized.

In addition, efficiency of the compressor is lowered when the inertia of the electric motor is decreased. Further, when the electric motor is miniaturized, a mechanical reliability of the compressor decreases and vibration increases.

In consideration of these problems, in some cases, a core is disposed at an end portion of a permanent magnet of a rotor to increase the inertia, but in this case, magnetic flux of the permanent magnet is leaked through the core disposed at the end portion of the permanent magnet. In addition, there is a problem in that an assembly process is complicated due to the addition of components made of a non-magnetic material to suppress leakage of the magnetic flux of the permanent magnet.

BRIEF DESCRIPTION OF THE DRAWINGS

Embodiments will be described in detail with reference to the following drawings in which like reference numerals refer to like elements, and wherein.

DETAILED DESCRIPTION

Figure 1:
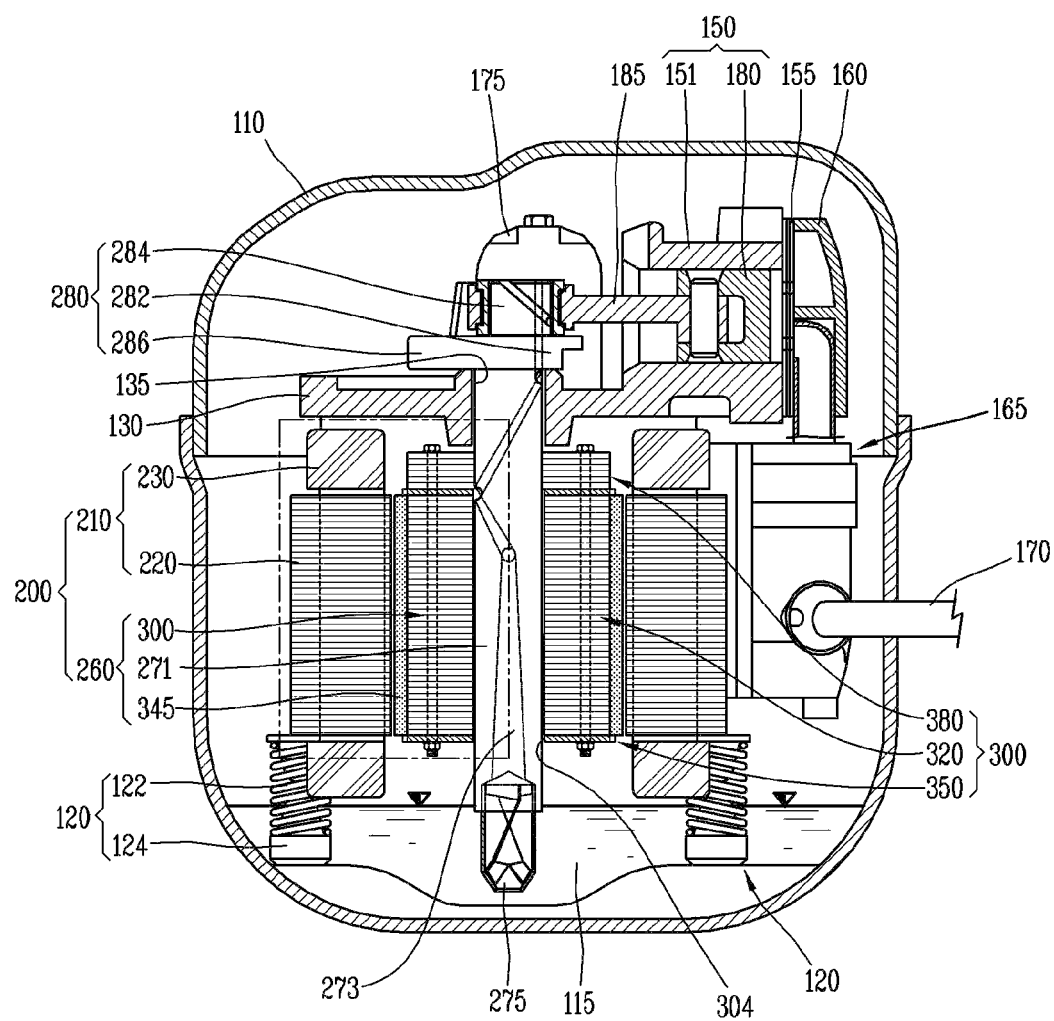
FIG. 1 is a sectional view of a compressor having an electric motor in accordance with an embodiment.

Hereinafter, embodiments will be described with reference to the accompanying drawings. Herein, like reference numerals denote like elements even in different embodiments, and a description for an element appearing first will replace descriptions for like elements appearing later. As used herein, the singular forms "a," "an," and "the" are intended to include the plural forms as well unless the context clearly indicates otherwise. In describing embodiments disclosed in the specification, moreover, the description will be omitted when a specific description for publicly known technologies to which the disclosure pertains is judged to obscure the gist of the embodiments disclosed in the specification. Also, it should be noted that the accompanying drawings are merely illustrated to easily understand the embodiments disclosed in the specification, and therefore, they should not be construed to limit the technical spirit disclosed in the specification.

Figure 2:
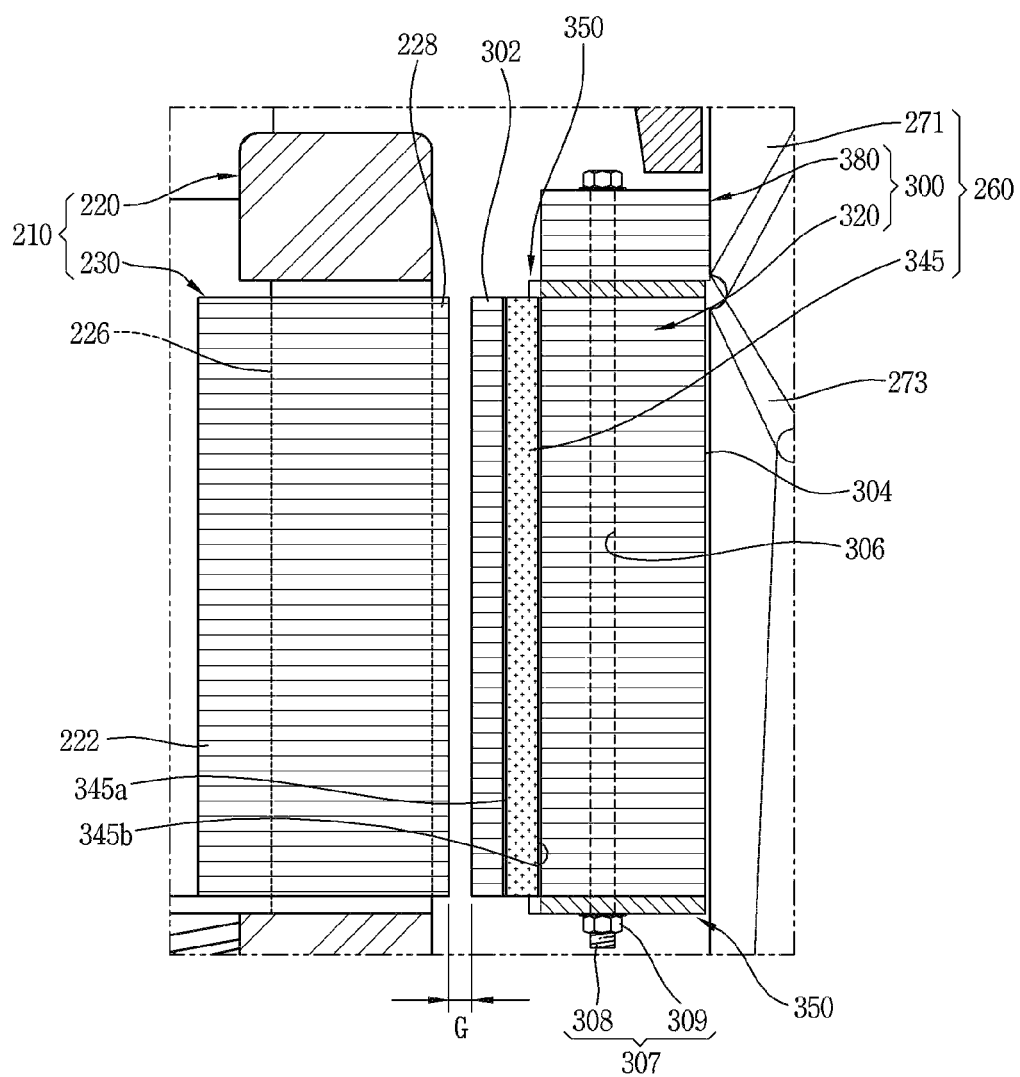
FIG. 2 is an enlarged view of a main portion of the electric motor of FIG. 1.
Figure 3:
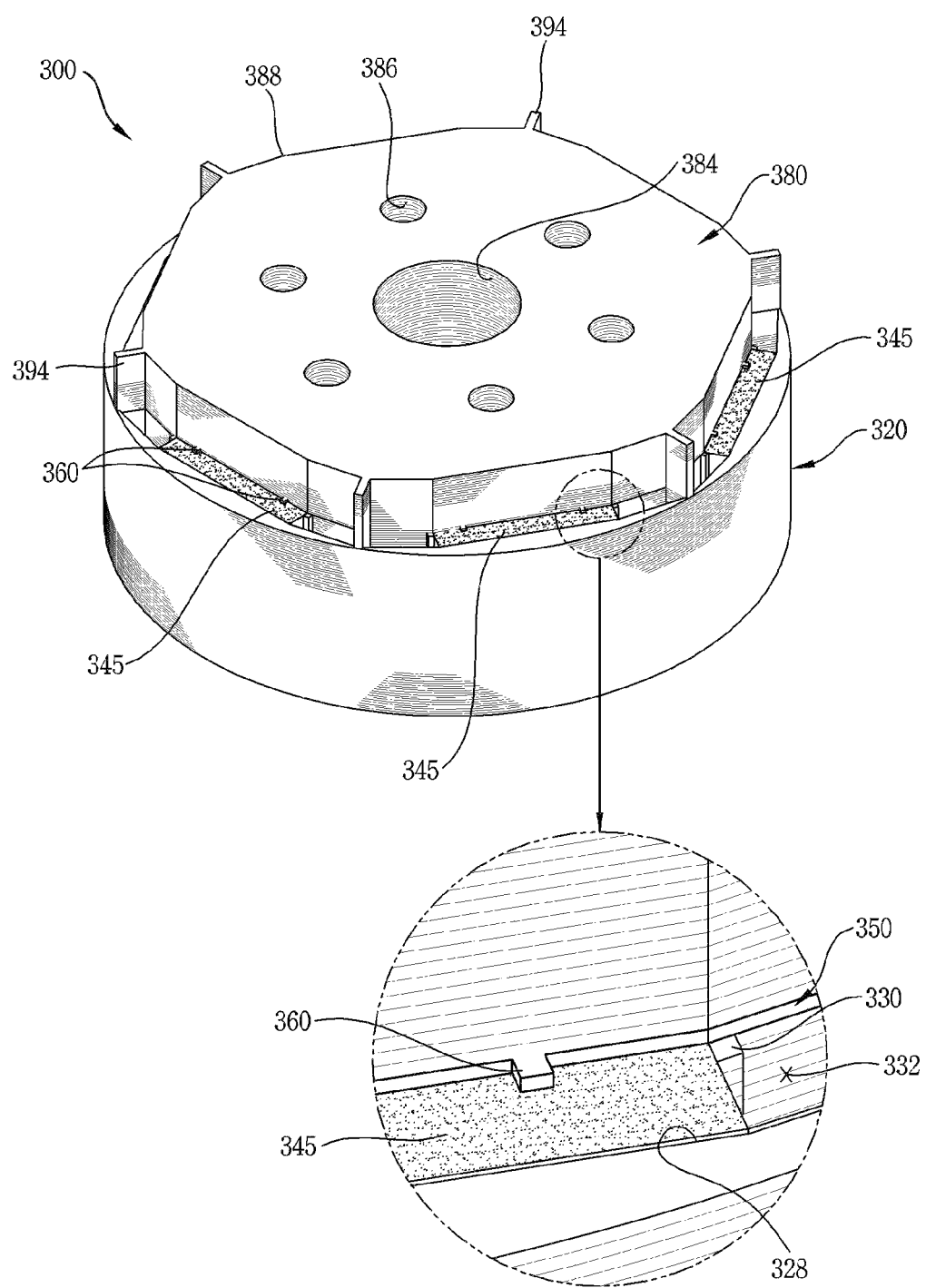
FIG. 3 is a perspective of a rotor of FIG. 2.
Figure 4:
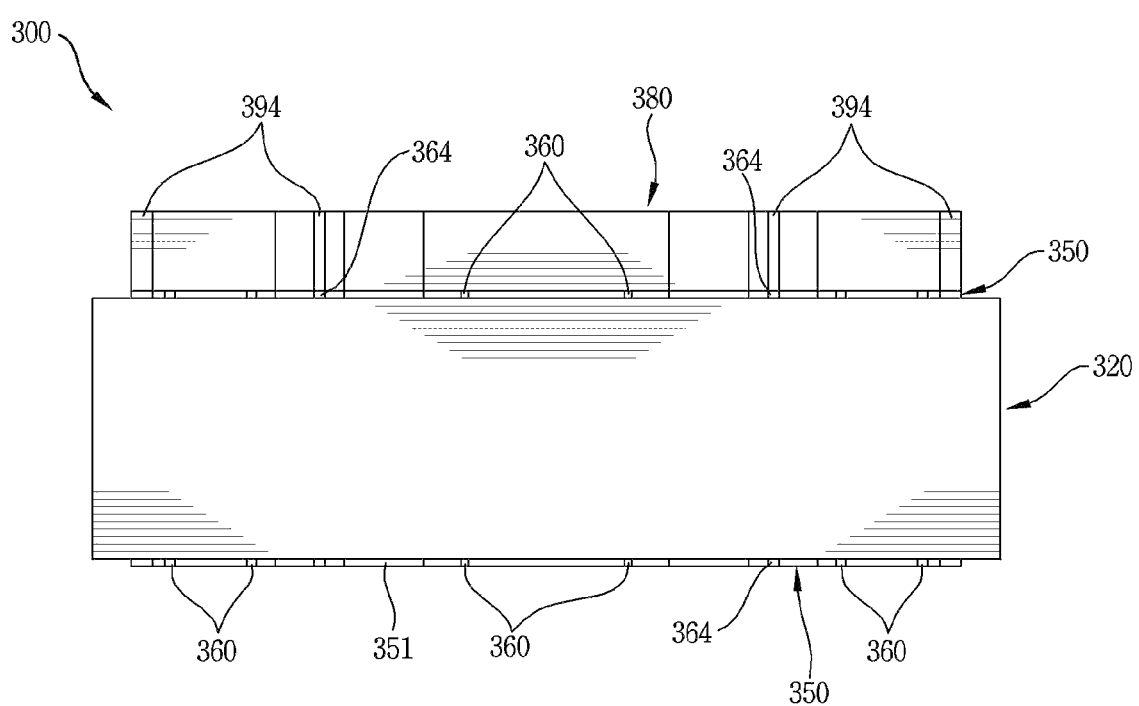
FIG. 4 is a lateral view of FIG. 3.

FIG. 1 is a sectional view of a compressor having an electric motor in accordance with an embodiment. FIG. 2 is an enlarged view of a main portion of the electric motor of FIG. 1. FIG. 3 is a perspective of a rotor of FIG. 2. FIG. 4 is a lateral view of FIG. 3. As illustrated in FIGS. 1 and 2, a compressor of this embodiment may include a case 110, a compression unit 150, and an electric motor 200.

The case 110 has a hermetic accommodating space therein. The compression unit 150 that compresses refrigerant may be located in the case 110. The compression unit 150 may be located in or at an upper portion in the case 110. The compression unit 150 may include, for example, a cylinder 151 having a compression space therein, a piston 180 disposed inside of the cylinder 151, and a connecting rod 185, one end of which is connected to the piston 180.

A suction valve 155 may be located at one side of the cylinder 151. A suction cover 160 may be disposed at an outer surface of the suction valve 155. A suction muffler 165 may be installed at one side (lower side in the drawing) of the suction cover 160. A suction pipe 170 may be connected to the suction muffler 165. The suction pipe 170 has one end that extends outwardly from the case 110. The suction pipe 170 may be connected to a refrigerant pipe of a refrigeration cycle device, which is not illustrated.

The electric motor 200 may be located in the case 110. The electric motor 200 may be located at a lower portion of the compression unit 150 in the case 110, for example. The electric motor 200 may include a stator 210, and a rotor 260 rotatably disposed with respect to the stator 210. The stator 210 may include a stator core 220, and a stator coil 230 wound around the stator core 220. The stator core 220 may be formed by, for example, stacking a plurality of electrical sheets 222 in an insulated manner. A rotor receiving hole 224 may be formed through the stator core 220 so that the rotor 260 may be rotatably received with a predetermined air gap G. A plurality of slots 226 and teeth 228 may be alternately arranged in a circumference of the rotor receiving hole 224.

The rotor 260 may include a rotational shaft 271, a rotor core 300 coupled to the rotational shaft 271, and permanent magnets 345 coupled to the rotor core 300. The rotational shaft 271 may extend at both sides of the rotor 260, respectively.

The rotor core 300 may be formed by stacking a plurality of electrical sheets 302 in an insulated manner. A rotational shaft hole 304 may be formed through the rotor core 300 so that the rotational shaft 271 may be inserted therethrough. A plurality of penetrating portions 306 may be formed through the rotor core 300 in an axial direction. Coupling members 307 may be coupled to the plurality of penetrating portions 306. The coupling member 307 may include, for example, a bolt 308 having a male screw portion and a nut 309 screwed to the male screw portion.

A frame 130 may be located at an upper side of the stator 210. The frame 130 may have a bearing 135 that rotatably supports the rotational shaft 271. An upper region of the rotational shaft 271 may penetrate the bearing 135 and extend upwardly. An eccentric portion 280 may be provided at an upper end of the rotational shaft 271. One end of the connecting rod 185 may be connected to the eccentric portion 280 to enable relative motion. Accordingly, rotational motion of the rotational shaft 271 may be converted into reciprocating motion and transmitted to the piston 180 by the eccentric portion 280 and the connecting rod 185.

The eccentric portion 280 may include, for example, a crank arm 282 that protrudes radially from a center of the rotational shaft 271 and a crank pin 284 coupled to the crank arm 282. An end of the connecting rod 185 may be connected to the crank pin 284 to enable relative motion. The rotational shaft 271 may be provided with a counter weight 286 to correspond to the eccentric portion 280.

A plurality of stator supporting portions or supports 120 that support the stator 210 may be located at a lower side of the stator 210. Each of the stator supporting portions 120 may include, for example, an elastic member 122 capable of vertically expanding and contracting and a leg portion or leg 124 coupled to a lower portion of the elastic member 122. The elastic member 122 may be, for example, a compressed coil spring.

Oil 115 may be stored in the case 110. The oil 115 may be injected up to a predetermined height from a lower portion of the case 110. An oil passage 273 through which the oil 115 may pass may be formed in the rotational shaft 271. An oil guide 275 that guides oil upwardly when the rotational shaft 271 is rotating may be located at a lower portion of the rotational shaft 271. Accordingly, when the rotational shaft 271 is rotating, the oil 115 guided upwardly from the lower portion of the case 110 by the oil guide 275 may be moved to an upper region of the rotational shaft 271 through the oil passage 273.

As illustrated in FIGS. 3 and 4, the rotor core 300 may have, for example, a first core 320 to which the permanent magnets 345 may be coupled, and a second core 380 disposed at an end of the first core 320 and to which the permanent magnets 345 are not coupled.

The permanent magnet 345 may have a shape with a rectangular cross-section. The permanent magnet 345 has an outer surface 345a, and an inner surface 345b spaced apart in a radial direction of the first core 320. The permanent magnet 345 may have a cuboid shape having a relatively thin thickness. The permanent magnet 345 may be made of, for example, rare earth magnets. The permanent magnet 345 may be made of, for example, a neodymium (Nd) magnet.

The rotor core 300 may have axial separation prevention members 350 disposed at both ends of the first core 320 and in contact with axial ends of the permanent magnets 345 to suppress axial separation of the permanent magnets 345.

Figure 5:
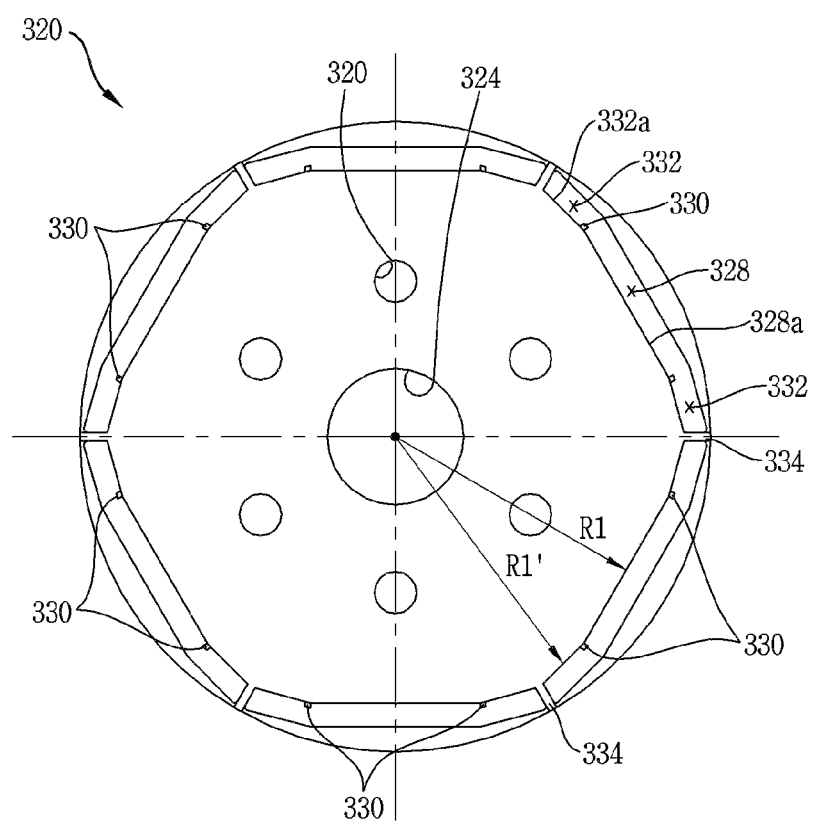
FIG. 5 is a planar view of a first core of FIG. 3.

FIG. 5 is a planar view of the first core of FIG. 3. As illustrated in FIG. 5, the first core 320 may be formed by stacking disk-shaped electrical sheets in an insulated manner. A rotational shaft hole 324 may be formed through a center of the first core 320 so that the rotational shaft 271 may be inserted therethrough. Permanent magnet coupling portions 328 may be formed through the first core 320 so that the permanent magnets 345 may be inserted therein. Flux barriers 332 may be formed at both sides of the permanent magnet coupling portion 328 in a circumferential direction. The permanent magnet coupling portion 328 and the flux barriers 332 may be formed to communicate with each other. An inner surface 332a of the flux barrier 332 may extend from an inner surface 328a of the permanent magnet coupling portion 328. A radial length R1' from a center of the first core 320 to the inner surface 332a of the flux barrier 332 may be longer than a radial length R1 from the center of the first core 320 to the inner surface 328a of the permanent magnet coupling portion 328. A first rib 334 may be located between flux barriers 332 that are adjacent to each other in the circumferential direction of the first core 320. The permanent magnet coupling portion 328 may include lateral movement restraining portions 330 that contact both ends of the permanent magnet 345, respectively.

Figure 6:
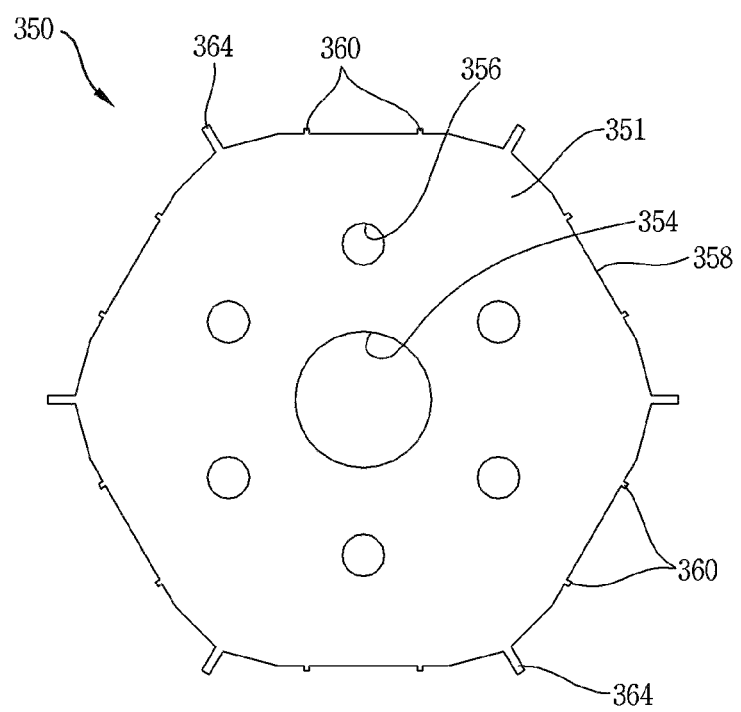
FIG. 6 is a planar view of an axial separation prevention member of FIG. 3.

FIG. 6 is a planar view of an axial separation prevention member of FIG. 3. As illustrated in FIG. 6, the axial separation prevention member 350 may be made of, for example, a magnetic material. The axial separation prevention member 350 may include a body 351 formed of a disk-shaped electrical sheet. The axial separation prevention member 350 may have a diameter identical to a diameter of the first core 320. The axial separation prevention member 350 may include an electrical sheet which is the same as the first core 320. A rotational shaft hole 354 may be formed through a center of the axial separation prevention member 350 so that the rotational shaft 271 may be inserted therethrough.

An empty space portion or space 358 cut out corresponding to an axial end of the rotational shaft 271 may be formed through the axial separation prevention member 350. Accordingly, magnetic flux leakage of the permanent magnets 345 may be restricted. More specifically, the empty space portion 358 may be formed, for example, to correspond to the permanent magnet coupling portion 328 and the flux barriers 332. The axial separation prevention member 350 may have an end surface contact portion 360 that protrudes to contact an axial end surface of the permanent magnet 345. Accordingly, axial separation of the permanent magnet 345 may be suppressed. The end surface contact portion 360 may protrude outwardly into the empty space portion 358 in the radial direction. A plurality of the end surface contact portion 360 may be formed spaced apart from each other in the circumferential direction.

Figure 7:
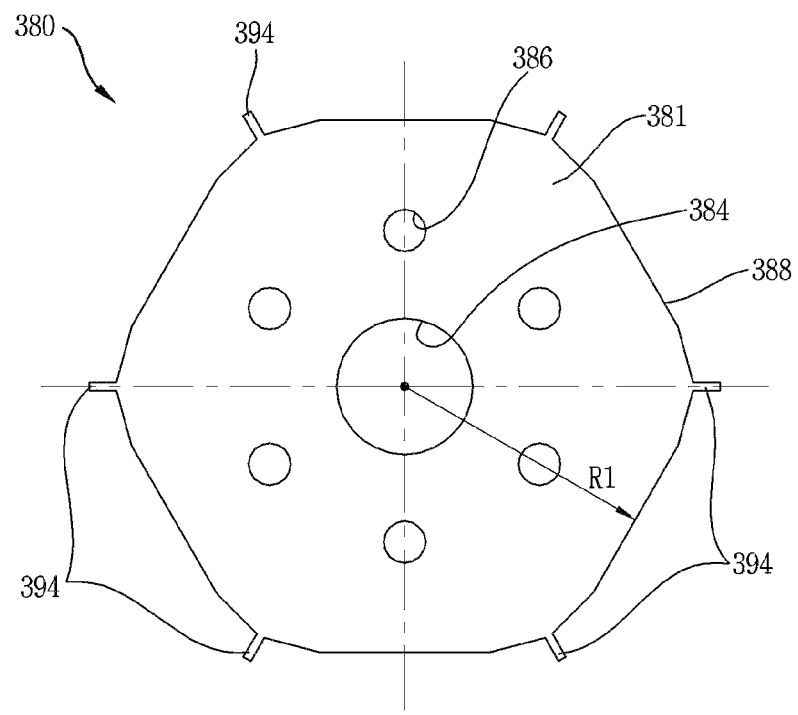
FIG. 7 is a planar view of a second core of FIG. 3.

FIG. 7 is a planar view of a second core of FIG. 3. As illustrated in FIG. 7, the second core 380 may be formed by stacking electrical sheets in an insulated manner. This may result in increasing a mass of the rotor 260, and thereby increasing a rotational inertia of the rotor 260. More specifically, the second core 380 is made of, for example, a magnetic material.

The second core 380 may have rims or outer surfaces 388 on an outer side in the radial direction. At least a portion of the outer surfaces 388 of the second core 380 may have disposed inside of an extension line that extends in the axial direction from the inner surface 345b of the permanent magnet 345.

The second core 380 may have rims or the outer surfaces 388 each disposed at an inner side of the extension line extending axially from the inner surface of the permanent magnet 345. Accordingly, magnetic flux leakage of the permanent magnet 345 through the second core 380 may be restricted.

The outer surfaces 388 of the second core 380 may be linearly cut to correspond to inner surfaces 328a of the permanent magnet coupling portions 328 and the inner surfaces 332a of the flux barriers 332.

A radial length R2 to the outer surface 388 of the second core 380 around a region adjacent to the permanent magnet 345 may be equal to the radial length R1 to the permanent magnet coupling portion 328. In this embodiment, it is illustrated that the radial length R2 is equal to the radial length R1; however, this is only one example, and the radial length R2 may be less than the radial length R1.

A rotational shaft hole 384 may be formed through the second core 380 so that the rotational shaft 271 may be inserted therethrough. As a result, a mutual contact surface (contact length) between the rotor 260 and the rotational shaft 271 may be increased, thereby increasing a coupling force between the rotor 260 and the rotational shaft 271. A plurality of penetrating portions 386 may be formed around the rotational shaft hole 384.

Second ribs 394 may be located on the outer surfaces 388 of the second core 380 to correspond to the first ribs 334 of the first core 320, respectively. The second ribs 394 may have widths and protruding lengths identical to those of the first ribs 334. The second ribs 394 may protrude to contact a circumference with a diameter the same as a circumference of the first core 320. Accordingly, an assembly process of the rotor 260 may be simplified by assembling the second core 380 and the first core 320 in the same process.

With this configuration, the permanent magnets 345 may be respectively coupled to the permanent magnet coupling portions 328 of the first core 320, and the axial separation prevention members 350 may be respectively disposed at both end portions or ends of the first core 320. Accordingly, axial separation of the permanent magnets 345 may be suppressed.

The second core 380 may be disposed at an upper end of the first core 320 in an axial direction. The rotational shaft 271 may be inserted into the rotational shaft hole 324 of the first core 320, the rotational shaft hole 354 of the axial separation prevention member 350, and the rotational shaft hole 384 of the second core 380.

When starting an operation to apply power to the stator 210, the rotor 260 may be rotated about the rotational shaft 271 by an interaction of a magnetic field. As a mass of the rotor 260 is increased due to the second core 380, the rotational inertia of the rotor 260 may be increased. The second core 380 may be formed such that the outer surfaces thereof may be disposed inside of the extension lines extending axially from the inner surfaces of the permanent magnets 345, so that magnetic flux leakage of the permanent magnets 345 through the second core 380 may be restricted.

Figure 8:
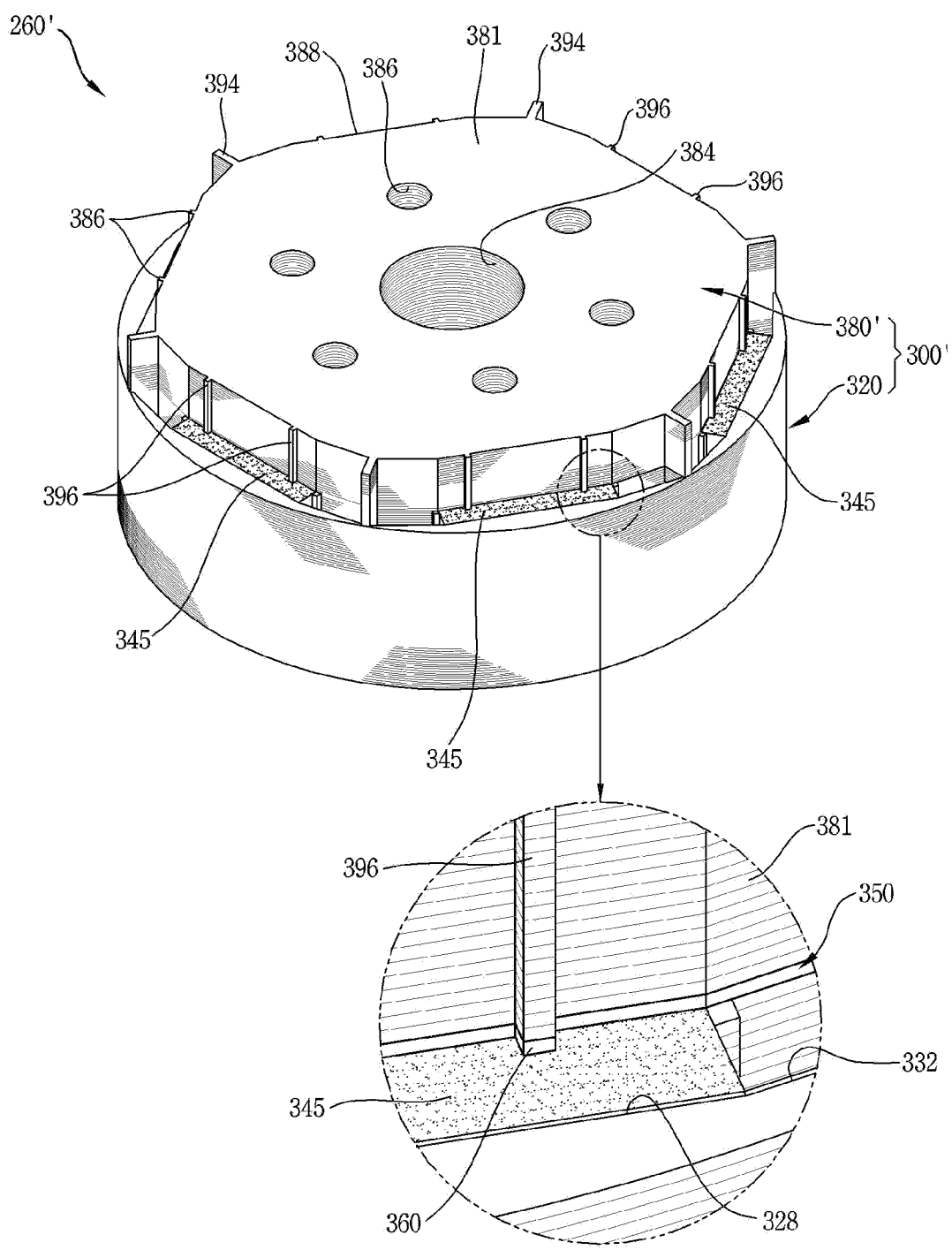
FIG. 8 is a modified example of the rotor of FIG. 3.
Figure 9:
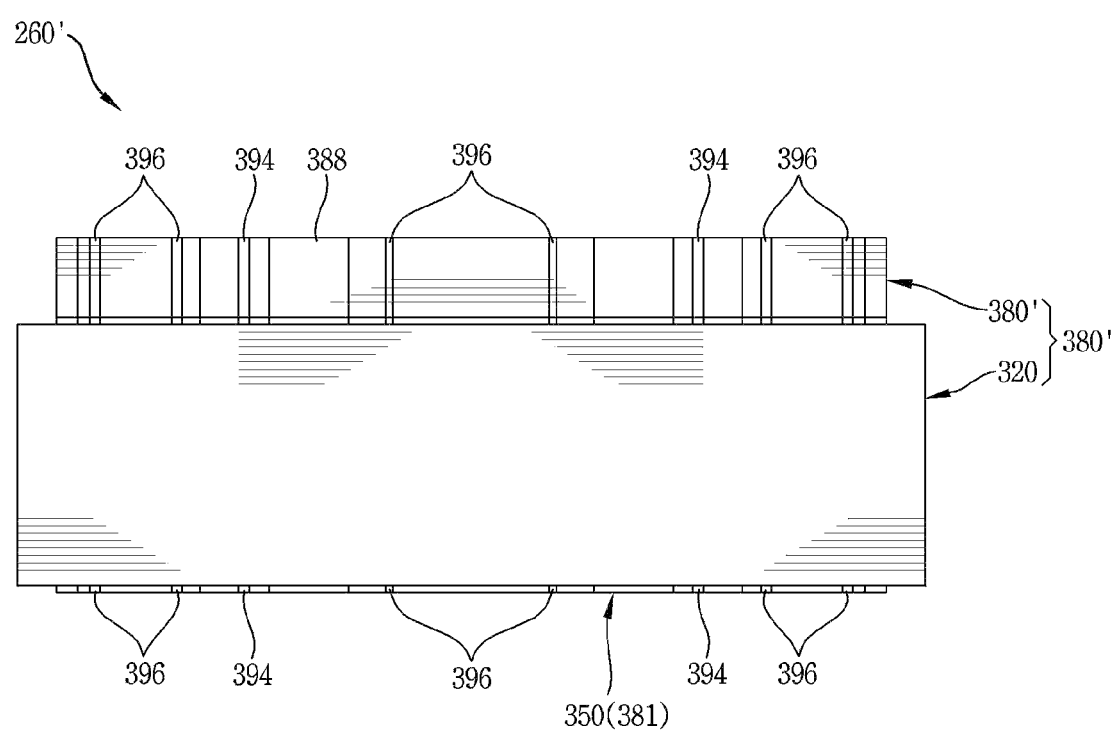
FIG. 9 is a lateral view of FIG. 8.

FIG. 8 is a modified example of the rotor of FIG. 3. FIG. 9 is a lateral view of FIG. 8. As illustrated in FIGS. 8 and 9, rotor 260' may include rotational shaft 271, rotor core 300' coupled to the rotational shaft 271, and permanent magnets 345 coupled to the rotor core 300'.

The rotor core 300' may have, for example, first core 320 to which the permanent magnets 345 may be coupled, axial separation prevention member 350' disposed at one or a first end or side of the first core 320 in the axial direction, and second core 380' disposed at another or a second end or side of the first core 320 in the axial direction.

The first core 320 may be formed by stacking disk-shaped electrical sheets in an insulated manner. The first core 320 may include a plurality of permanent magnet coupling portions 328 formed through in the axial direction so that the permanent magnets 345 may be inserted therein. Flux barriers 332 may be formed through both sides of the permanent magnet coupling portion 328. The flux barriers 332 may communicate with the permanent magnet coupling portion 328, respectively. Each of first ribs 334 may be located between the flux barriers 332 that are adjacent to each other among the flux barriers 332.

The second core 380' may include a body 381 made of a magnetic material. The body 381 may have outer surfaces 388 disposed inside of extension lines that extend axially from the inner surfaces of the permanent magnets 345. The second core 380' may include a plurality of second ribs 394 that protrudes radially to correspond to the first ribs 334. The second ribs 394 may have widths and protruding lengths identical to those of the first ribs 334.

The second core 380' may have end surface contact portions 396 each protruding outwardly to a region corresponding to the inner surface of the permanent magnet coupling portion 328 and contacting an end surface of the permanent magnet 345. Accordingly, axial separation of the permanent magnets 345 may be suppressed.

The axial separation prevention member 350 may be located at a lower end of the first core 320. The axial separation prevention member 350 may have a configuration same as that of the second core 380'. This embodiment illustrates a case in which the axial separation prevention member 350 is implemented by disposing the electrical sheet (body 381) of the second core 380' at a lower end of the first core 320.

With this configuration, each of the permanent magnets 345 may be coupled to the permanent magnet coupling portions 328 of the first core 320. The axial separation prevention member 350 may be disposed at the lower end of the first core 320. Accordingly, downward separation of the permanent magnets 345 may be suppressed.

The second core 380' may be disposed at an upper end portion or end of the first core 320. Accordingly, upward separation of the permanent magnet 345 may be suppressed.

As a mass of the rotor 260' is increased due to the second core 380', rotational inertia of the rotor 260' may be increased. Accordingly, operation efficiency of the compressor may be improved.

Figure 10:
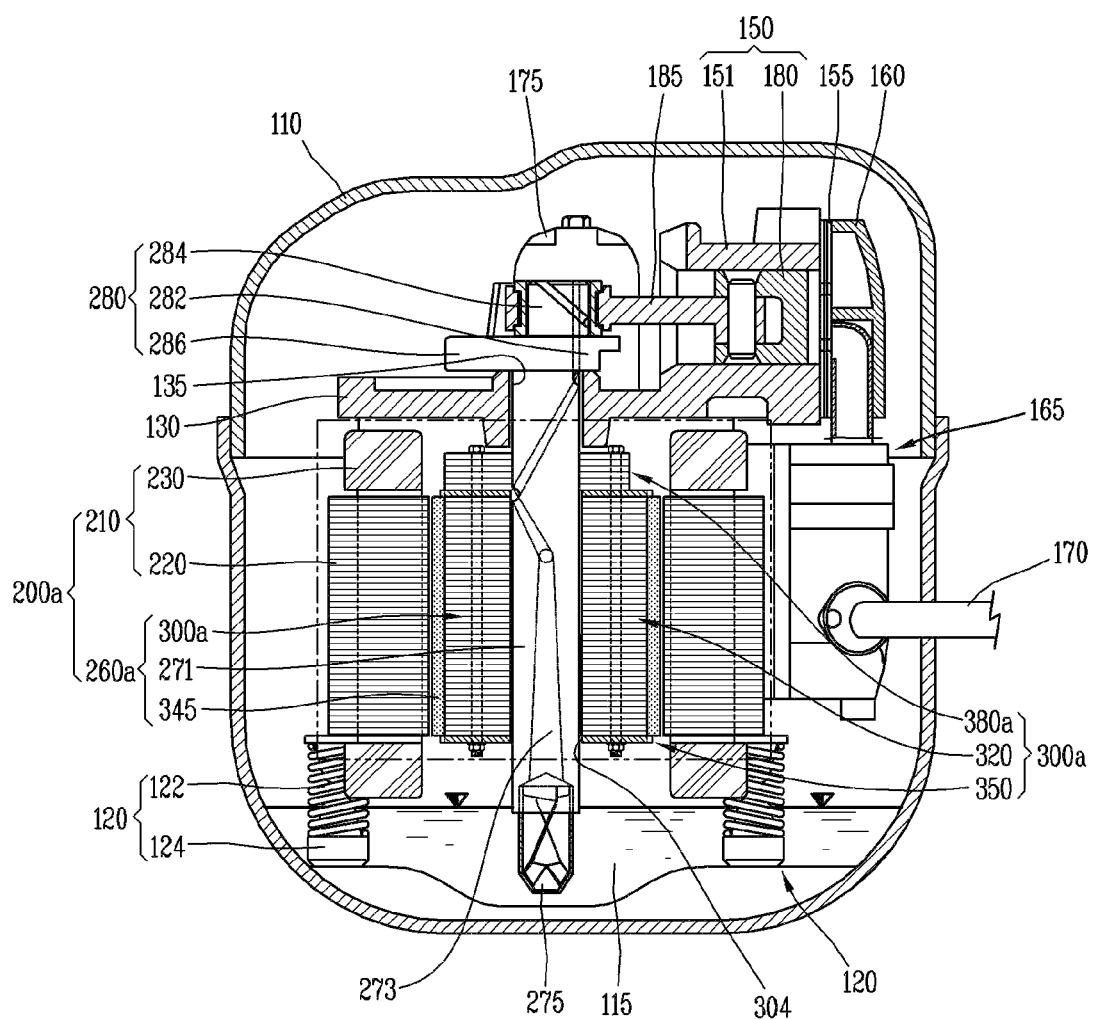
FIG. 10 is a sectional view of a compressor having an electric motor in accordance with another embodiment.
Figure 11:
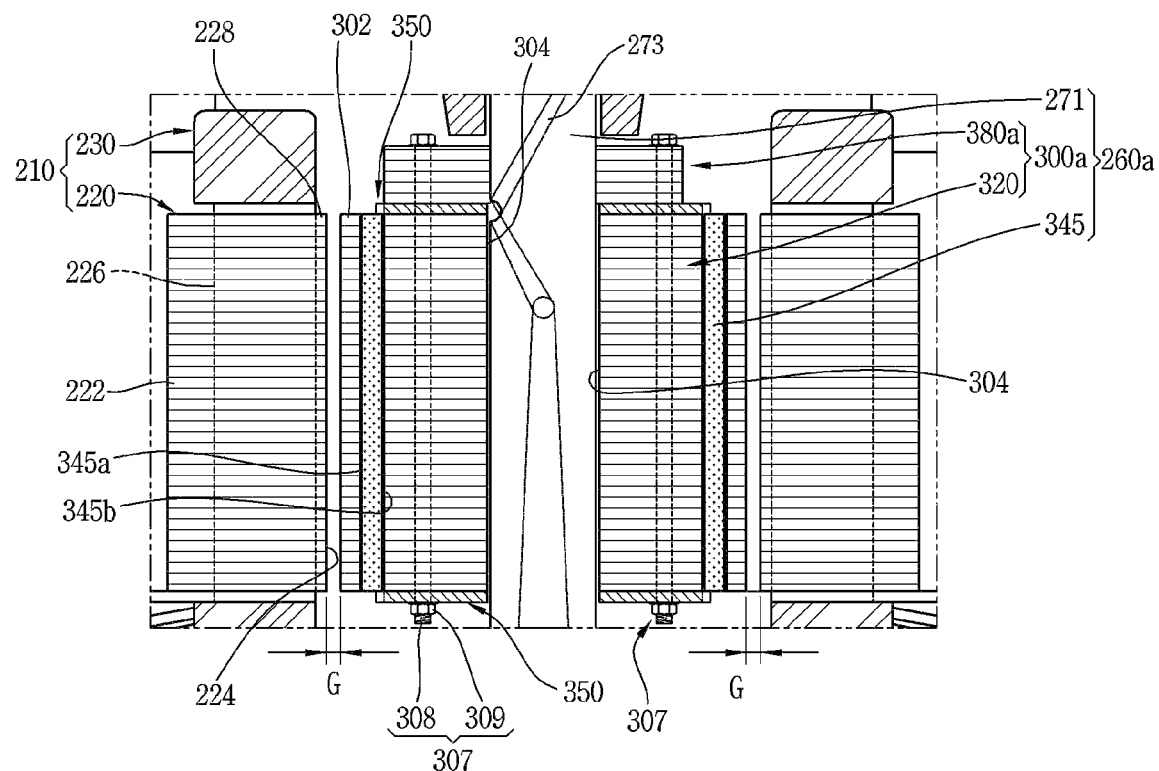
FIG. 11 is an enlarged view of a main portion of the electric motor of FIG. 10.
Figure 12:
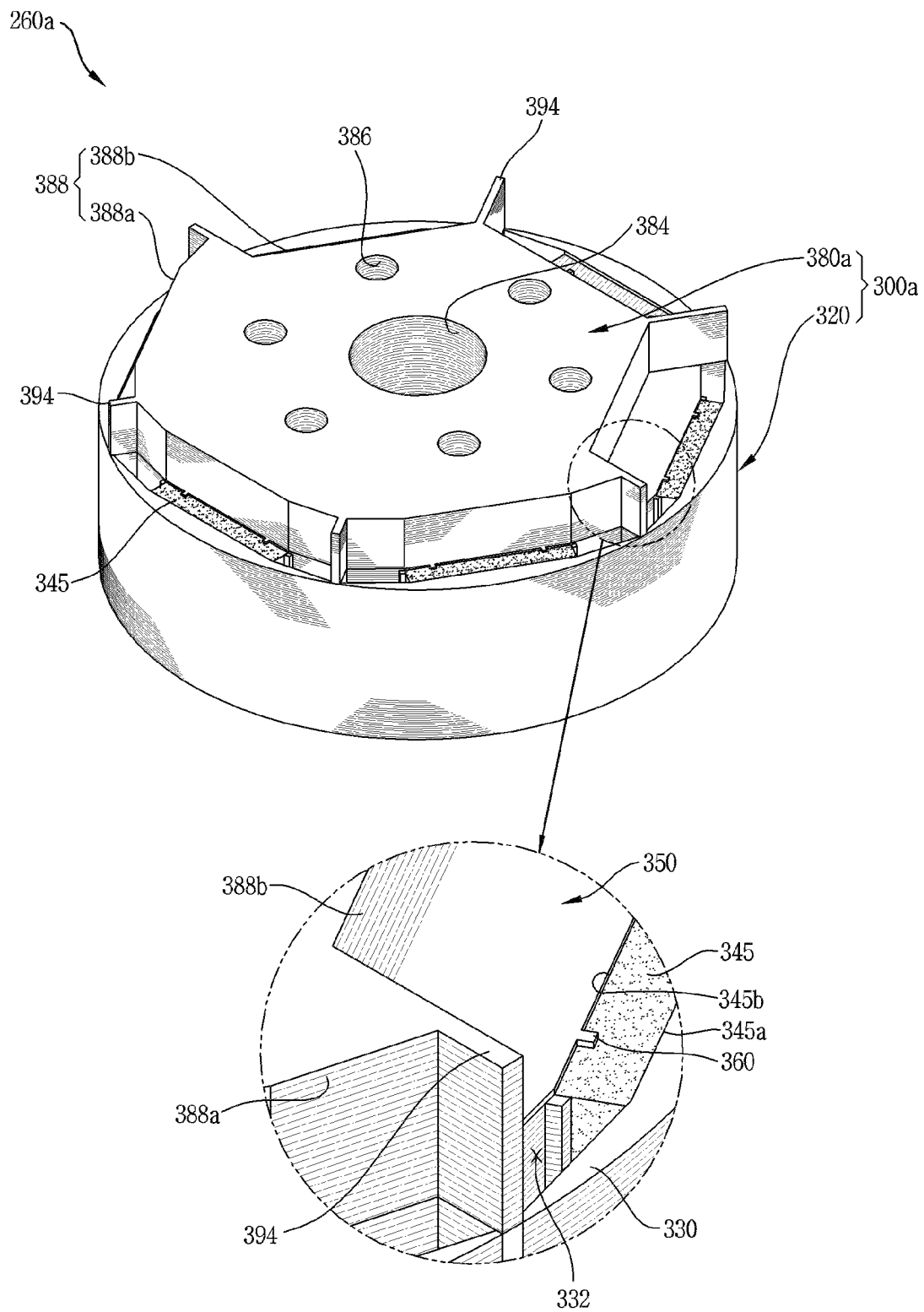
FIG. 12 is a perspective of a rotor of FIG. 11.
Figure 13:
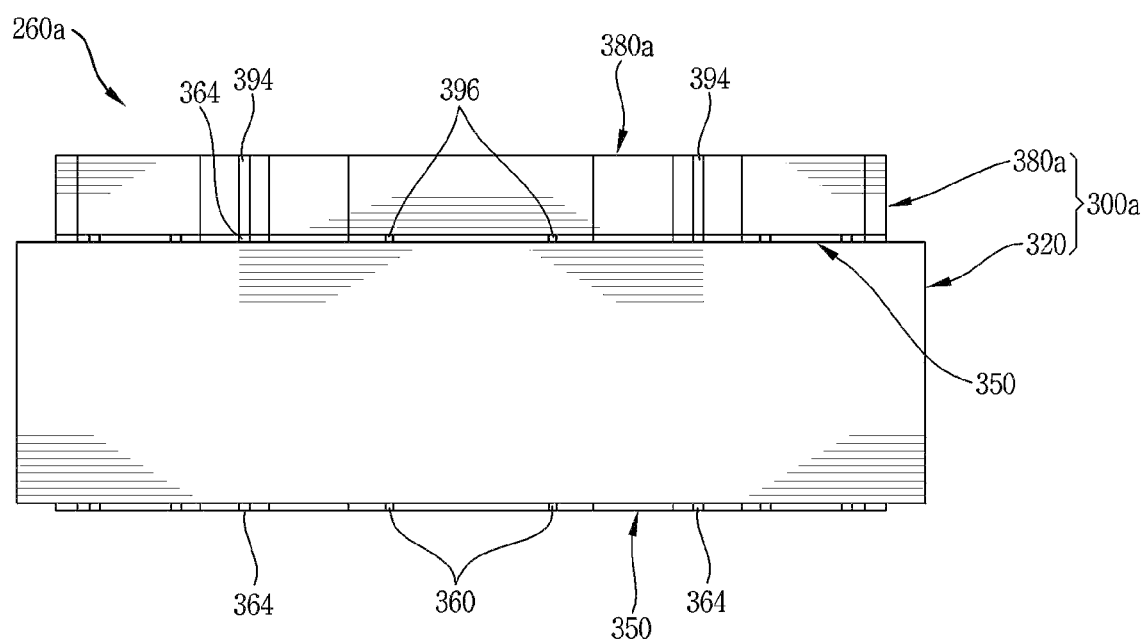
FIG. 13 is a lateral view of FIG. 12.

FIG. 10 is a cross-sectional view of a compressor having an electric motor in accordance with another embodiment. FIG. 11 is an enlarged view of a main portion of the electric motor of FIG. 10. FIG. 12 is a perspective of a rotor of FIG. 11. FIG. 13 is a lateral view of FIG. 12. As illustrated in FIGS. 10 to 13, the compressor of this embodiment may include case 110, compression unit 150, and electric motor 200a.

The case 110 has a hermetic accommodating space therein. The compression unit 150 may include, for example, cylinder 151, piston 180 disposed inside of the cylinder 151, and connecting rod 185, one end of which may be connected to the piston 180. The electric motor 200a may be located at a lower side of the compression unit 150. The electric motor 200a may include stator 210, and rotor 260a rotatably disposed with respect to the stator 210 so that the rotor 260a is received with an air gap G therebetween.

The rotor 260a may include a rotational shaft 271, rotor core 300a coupled to the rotational shaft 271, and permanent magnets 345 coupled to the rotor core 300a. The rotor core 300a may have, for example, first core 320 to which the permanent magnets 345 may be coupled, and second core 380a coupled to an end portion or end of the first core 320 in an axial direction and to which the permanent magnets 345 are not coupled.

The permanent magnet 345 may have a shape with a rectangular cross-section. The permanent magnet 345 may have outer surface 345a and inner surface 345b spaced apart in a radial direction of the first core 320. The first core 320 may be formed by stacking disk-shaped electrical sheets in an insulated manner. The first core 320, as described above, may have a rotational shaft hole 324 and a plurality of penetrating portions 326. The first core 320 may include a plurality of permanent magnet coupling portions 328 formed therethrough in the axial direction so that the permanent magnets 345 may be inserted therein. The first core 320 may have flux barriers 332 formed to communicate with both ends of the permanent magnet coupling portion 328. The first core 320 may include a plurality of first ribs 334 each disposed between the flux barriers 332 in the radial direction.

Both end portions or ends of the first core 320 may have axial separation prevention members 350 each having an end surface contact portion 360 contacting an end surface of the permanent magnet 345. The second core 380a may be disposed on or at an upper side of the first core 320 and extending in the axial direction. The axial separation prevention member 350, the first core 320, and the second core 380a may be integrally coupled by a coupling member 307.

Figure 14:
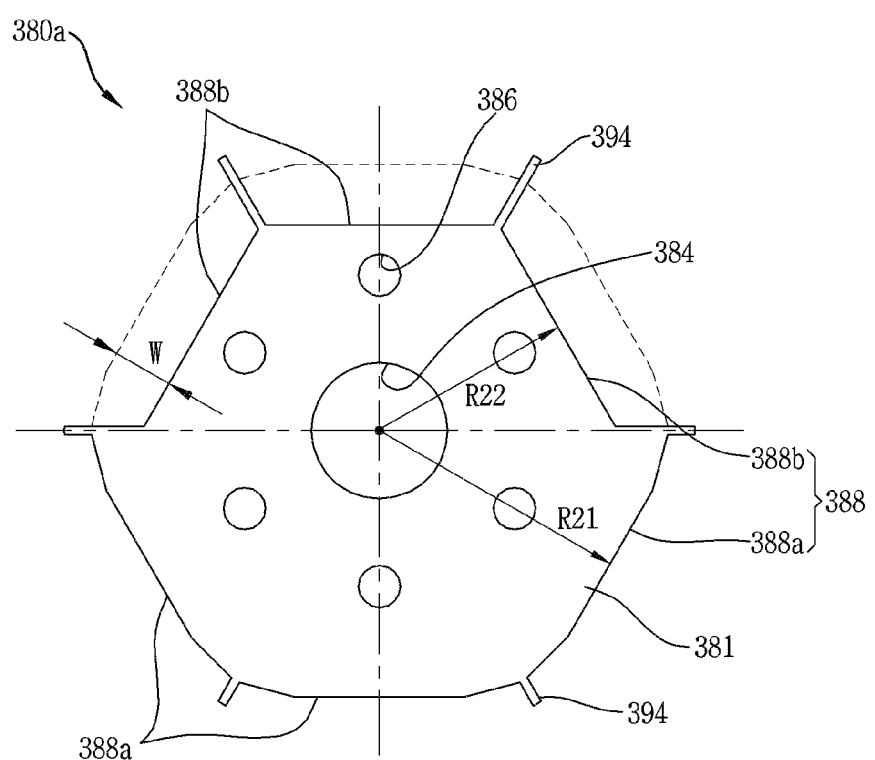
FIG. 14 is a planar view of a second core of FIG. 12.

FIG. 14 is a planar view of the second core of FIG. 12. As illustrated in FIG. 14, the second core 380a may be made of a magnetic material and have a body 381 coupled to an end portion or end of the first core 320 in the axial direction. The second core 380 may have rims or outer surfaces 388 on or at the outer side in the radial direction. At least a portion of the outer surfaces 388 of the second core 380a (body 381) may be disposed inside of an extension line that extends in the axial direction from inner surfaces of the permanent magnets 345.

The body 381 may have rotational shaft hole 384 and a plurality of penetrating portions 386. Second ribs 394 may be located to correspond to first ribs 334 of the first core 320, respectively.

The second core 380a may have first linear cutout portions 388a linearly cut to correspond to inner surfaces 382a of the permanent magnet coupling portions 328 and inner surfaces 332a of flux barriers 332. Each of the first linear cutout portions 388a may be located between the second ribs 394 that are adjacent to each other in the circumferential direction.

The second core 380a may have second linear cutout portions 388b cut with a predetermined width w so that outer surfaces thereof are closer to a center of the second core 380a than outer surfaces of the first linear cutout portions 388a to generate an unbalanced force in one direction when rotating. The outer surfaces 388 of the second core 380a have the first linear cutout portions 388a that are linearly cut to correspond to the inner surfaces 328a of the permanent magnet coupling portions 328 and the inner surfaces 332a of the flux barriers 332, and the second linear cutout portions 388b cut with a predetermined width w so that outer surfaces thereof are closer to the center of the second core 380a than the outer surfaces of the first linear cutout portions 388a.

The rotor 260a may include the axial separation prevention member 350 coupled to a lower end of the first core 320. The first linear cutout portions 388a and the second linear cutout portions 388b of the second core 380a may face each other with the center of the second core 380a interposed therebetween.

A radial length R21 to the first linear cutout portion 388a, that is, the outer surface 388 of the second core 380a in a region adjacent to the permanent magnet 345 may be equal to the radial length R1 to the permanent magnet coupling portion 328. A radial length R22 to the second linear cutout portion 388b, that is, the outer surface 388 of the second core 380a in a region adjacent to the permanent magnet 345 may be shorter than the radial length R1 of the permanent magnet coupling portion 328.

In this embodiment, three first linear cutout portions 388a may be consecutively arranged in the circumferential direction, and three second linear cutout portions 388b may be consecutively arranged in the circumferential direction.

Figure 15:
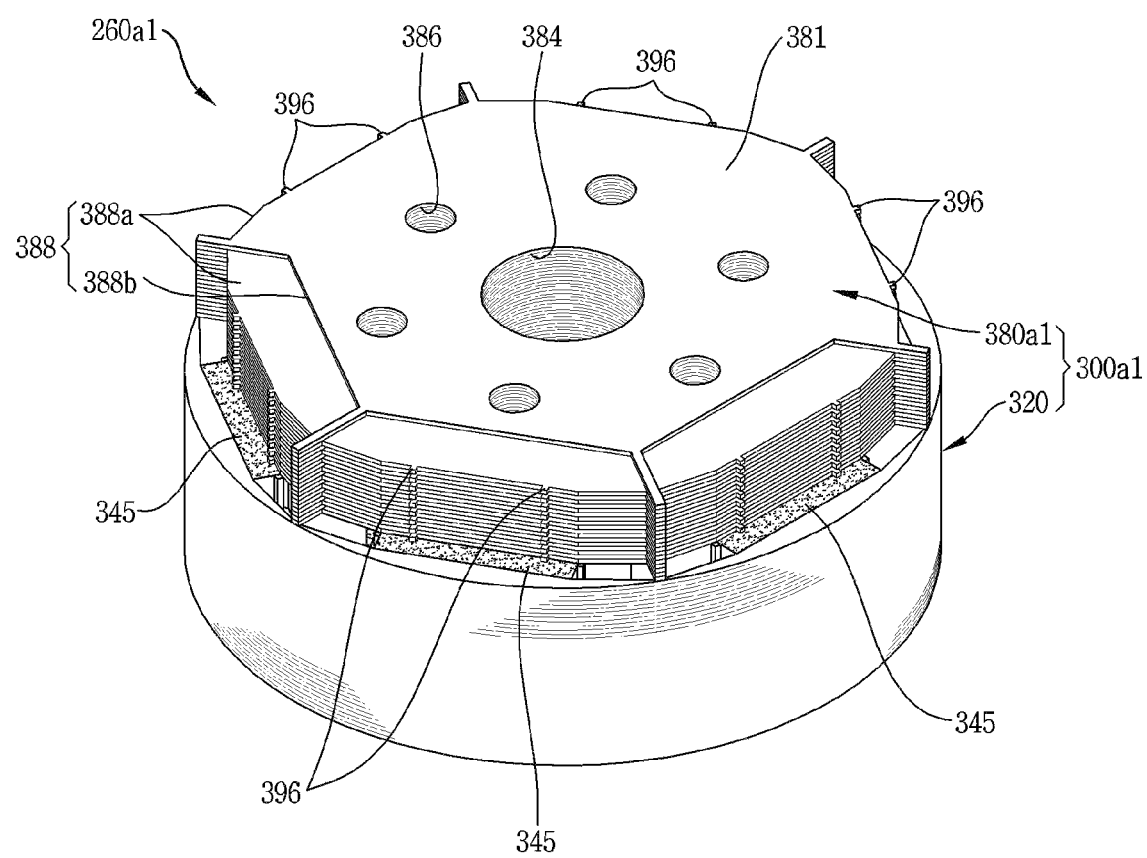
FIG. 15 is a modified example of the rotor of FIG. 12.
Figure 16:
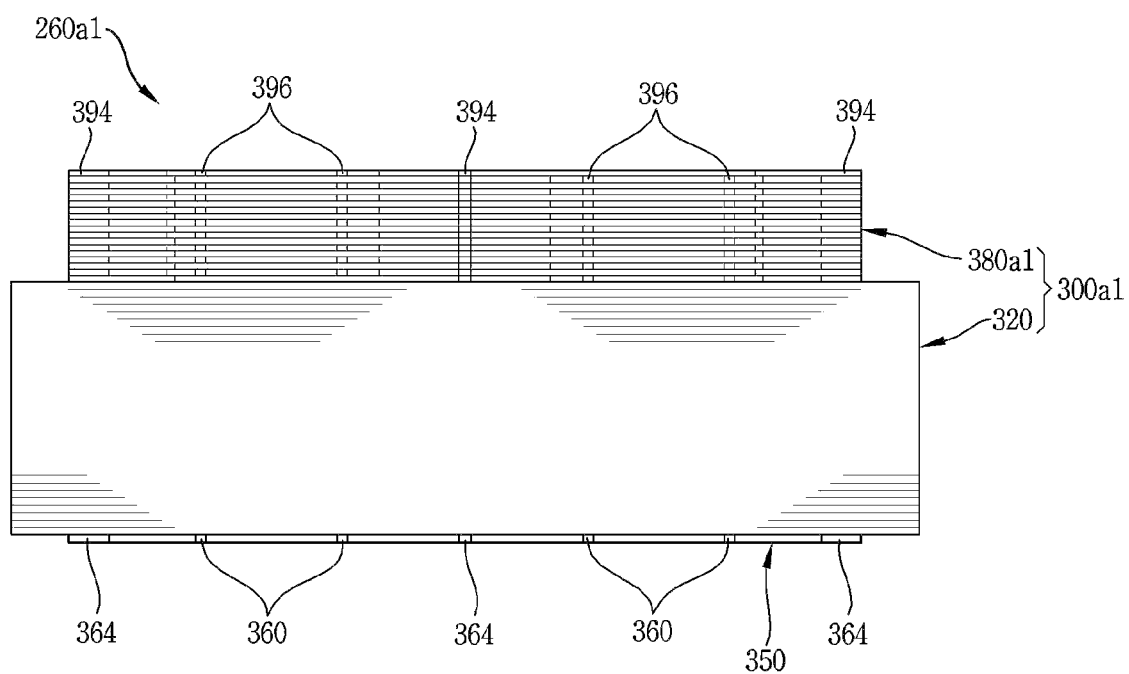
FIG. 16 is a lateral view of FIG. 15.

FIG. 15 is a modified example of the rotor of FIG. 12. FIG. 16 is a lateral view of FIG. 15. As illustrated in FIGS. 15 and 16, the rotor 260a1 may include a rotor core 300a1 and permanent magnets 345. Although not illustrated in the drawing, the rotor 260a1 may include rotational shaft 271.

The rotor core 300a1 may have, for example, first core 320 to which the permanent magnets 345 may be coupled, and second core 380a1 made of a magnetic material and coupled to an end portion or end of the first core 320 in an axial direction.

The first core 320 may include permanent magnet coupling portions 328 formed through in the axial direction so that the permanent magnets 345 may be inserted therein. The first core 320, as described above, may have rotational shaft hole 324, a plurality of penetrating portions 326, and a plurality of first ribs 334.

The rotor 260a1 may be provided at an end portion or end of the first core 320 with axial separation prevention member 350 that suppresses axial separation of the permanent magnets 345. The axial separation prevention member 350 may be made of a magnetic material, have empty space portions or spaces 358 corresponding to axial end surfaces of the permanent magnets 345, and end surface contact portion 360s in contact with axial ends of the permanent magnets 345.

The second core 380a1 may include body 381 made of a magnetic material. Rotational shaft hole 384 and a plurality of penetrating portions 386 may be formed through the body 381 of the second core 380a1. The second core 380a1 may have a plurality of second ribs 394 corresponding to the first ribs 334 of the first core 320.

Outer surfaces 388 of the second core 380a1 may be formed asymmetrically so that an unbalanced force is generated in one direction during rotation. The outer surfaces 388 of the second core 380a1 may have, for example, first linear cutout portions 388a cut linearly to correspond to inner surfaces of permanent magnet coupling portions 328 and inner surfaces of flux barriers 332 each disposed between the second ribs 394 that are adjacent to each other, and second linear cutout portions 388b each having an outer surface cut to be close to a center of the second core 380a1 formed by further cutting out the outer surface thereof than the first linear cutout portions 388a.

Electrical sheets of the second core 380a1 may be configured such that the first linear cutout portion 388a and the second linear cutout portion 388b are alternately arranged in the axial direction. More specifically, when two electrical sheets of the second core 380a1 are stacked in a vertical direction, they may be disposed such that the first linear cutout portions 388a are disposed right below the second linear cutout portions 388b. With this configuration, the second core 380a1 may increase a mass of the rotor 260a1 without generating an unbalanced rotation force when the rotor 260a1 rotates.

Figure 17:
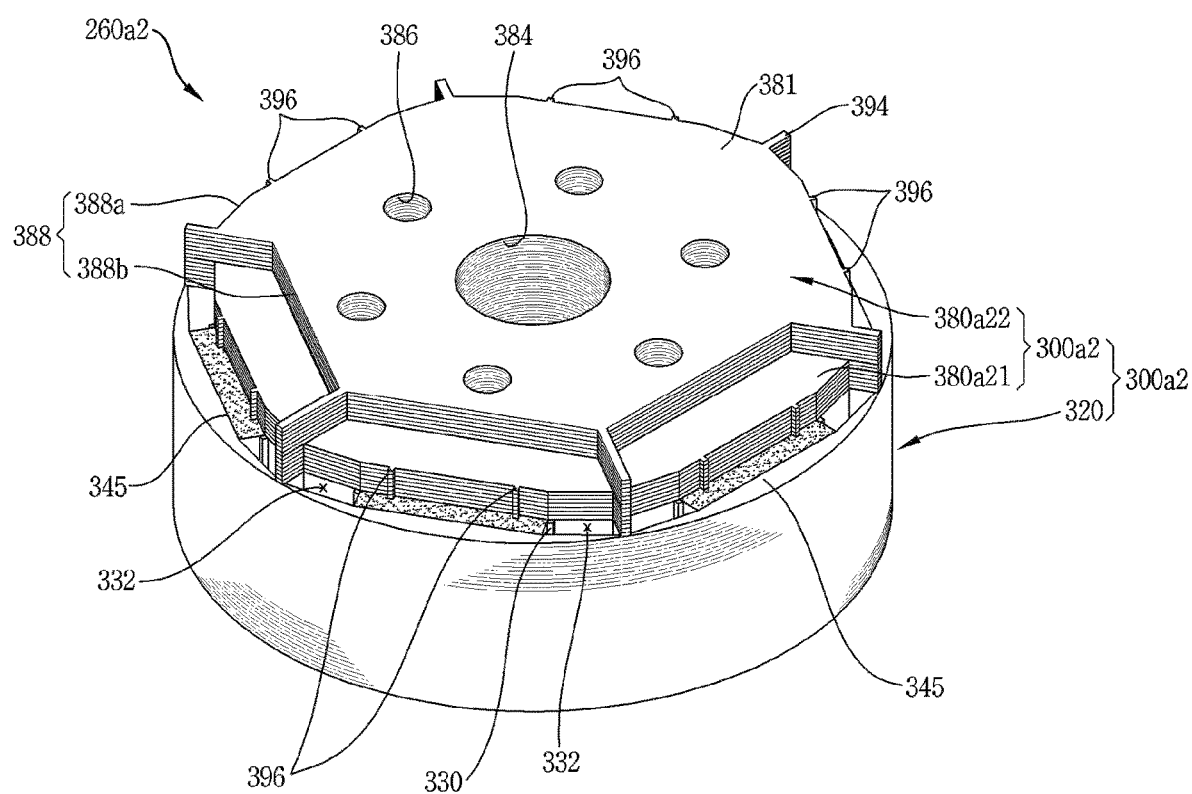
FIG. 17 is another modified example of the rotor of FIG. 12.
Figure 18:
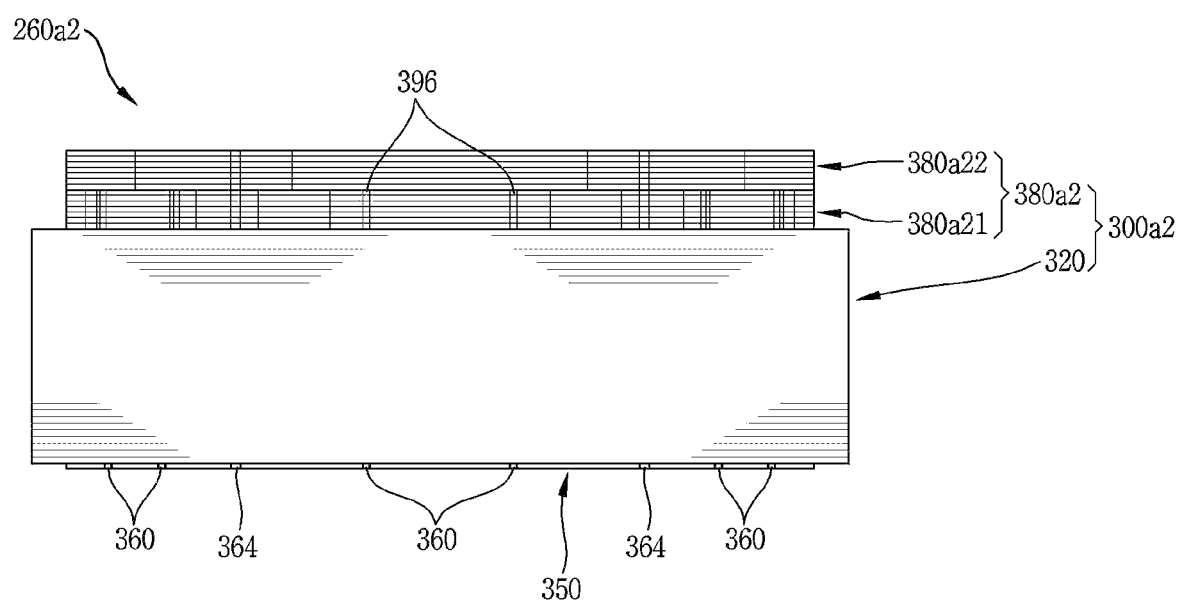
FIG. 18 is a lateral view of FIG. 17.

FIG. 17 is another modified example of the rotor of FIG. 12. FIG. 18 is a lateral view of FIG. 17. As illustrated in FIGS. 17 and 18, rotor 260a2 of this embodiment may include a rotor core 300a2 and permanent magnets 345. Although not illustrated in the drawing, the rotor 260a2 may include rotational shaft 271.

The rotor core 300a2 may have, for example, first core 320 to which permanent magnets 345 may be coupled, and second core 380a2 coupled to an end portion of the first core 320 in an axial direction. The first core 320 may include permanent magnet coupling portions 328 formed through in the axial direction so that the permanent magnets 345 may be coupled therethrough. Flux barriers 332 may be formed through both end portions of the permanent magnet coupling portion 328. The first core 320 may include first ribs 334 each disposed in the radial direction between the flux barriers 332 that are adjacent to each other.

An axial separation prevention member 350 that suppresses axial separation of the permanent magnets 345 may be located at an end portion or end of the first core 320. The axial separation prevention member 350 may be made of a magnetic material, have empty space portions or spaces 358 corresponding to axial end surfaces of the permanent magnets 345, and end surface contact portion 360 in contact with axial end portions of the permanent magnets 345.

As described above, the second core 380a2 may include electrical sheets having first linear cutout portions 388a cut linearly to correspond to inner surfaces of permanent magnet coupling portions 328 and inner surfaces of flux barriers 332 located between second ribs 394 that are adjacent to each other, and second linear cutout portions 388b each having an outer surface cut to be close to a center of the second core 380a2 formed by further cutting out the outer surface thereof than the first linear cutout portions 388a.

The second core 380a2 may include first stacked unit 380a21 and second stacked unit 380a22 formed by stacking a preset or predetermined number of electrical sheets each having first linear cutout portions 388a or second linear cutout portions 388b. In this embodiment, it is illustrated that the number of the stacked units is two; however, this is only an example, and the number may be appropriately adjusted.

The second core 380a2 may be configured such that the first linear cutout portions 388a and the second linear cutout portions 388b of the first stacked unit 380a21 and the second stacked unit 380a22 are stacked to be alternately arranged in the axial direction. Accordingly, as the first linear cutout portions 388a and the second linear cutout portions 388b of the first stacked unit 380a21 and the second stacked unit 380a22 are disposed to face each other, an unbalanced force may not be generated during rotation. With this configuration, the second core 380a2 may increase a mass of the second core 380a2 without generating an unbalanced rotation force when the rotor 260a2 rotates, thereby increasing a rotational inertia of the rotor 260a2.

Figure 19:
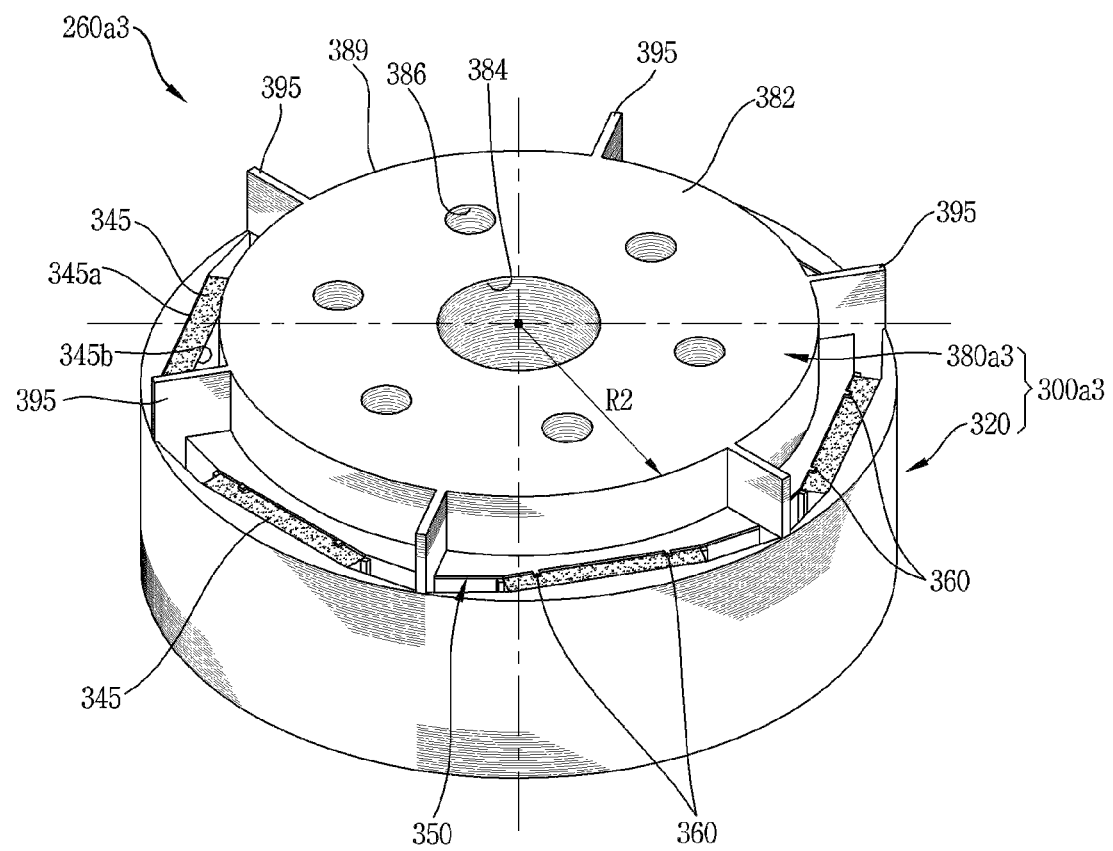
FIG. 19 is still another modified example of the rotor of FIG. 12.
Figure 20:
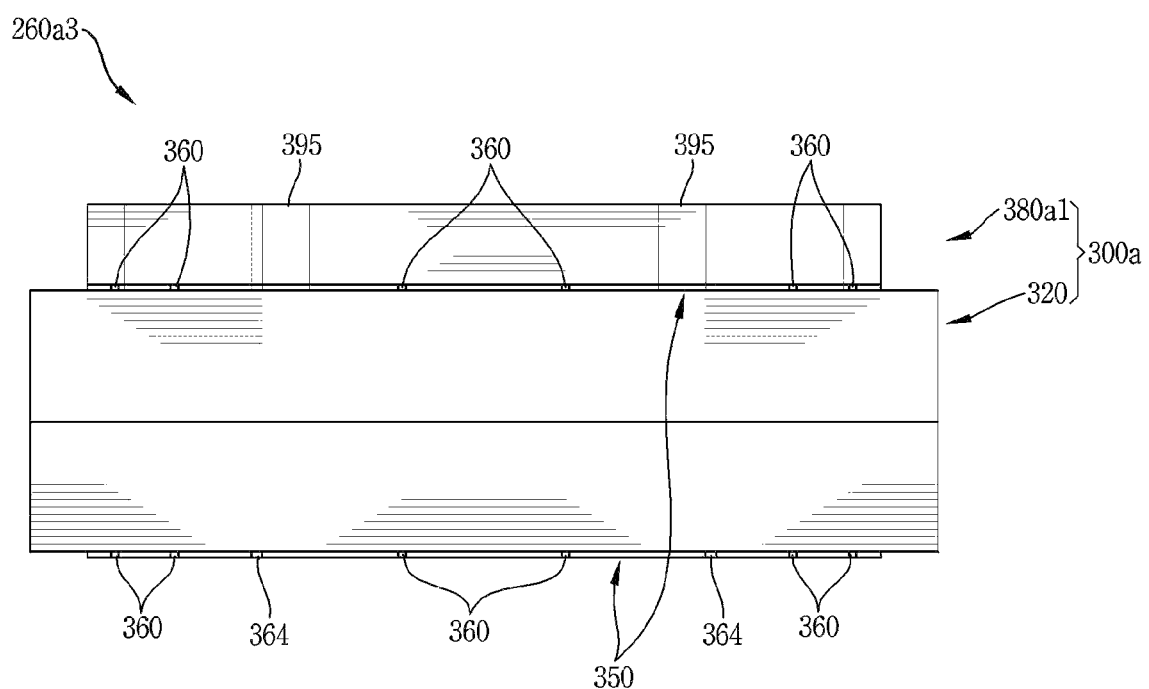
FIG. 20 is a lateral view of FIG. 19.

FIG. 19 is still another modified example of the rotor of FIG. 12. FIG. 20 is a lateral view of FIG. 19. As illustrated in FIGS. 19 and 20, rotor 260a3 may include rotor core 300a3 and permanent magnets 345. The permanent magnet 345 may have outer surface 345a and inner surface 345b spaced apart in a radial direction of first core 320. Although not illustrated in the drawing, the rotor 260a3 may include rotational shaft 271.

The rotor core 300a3 may have, for example, the first core 320 to which the permanent magnets 345 may be coupled, and a second core 380a3 made of a magnetic material and disposed at an end portion or end of the first core 320 in an axial direction. Permanent magnet coupling portions 328 may be formed through the first core 320 so that the permanent magnets 345 may be inserted therein. Flux barriers 332 may penetrate both sides of the permanent magnet coupling portion 328. The first core 320 may include first ribs 334 that protrude in the radial direction each located between the flux barriers 332 that are adjacent to each other.

The rotor 260a3 may be provided at an end portion or end of the first core 320 with axial separation prevention member 350 that suppresses axial separation of the permanent magnets 345. The axial separation prevention member 350 may be made of a magnetic material, have empty space portions or spaces 358 corresponding to axial end surfaces of the permanent magnets 345, and end surface contact portions 360 in contact with the axial ends of the permanent magnets 345.

The second core 380a3 may have a body 382 formed of electrical sheets in a substantially disk shape. The second core 380a3 may have a plurality of second ribs 394 corresponding to the first ribs 334 of the first core 320, and outer surfaces 389 (circular arc) each disposed between second ribs 394 that are adjacent to each other and corresponding to a circumference of inner surfaces of the permanent magnet coupling portions 328 of the first core 320.

A radial length R2 to the outer surface 389 of the second core 380a3 in a region adjacent to the permanent magnet 345 may be equal to or shorter than a radial length R1 to the permanent magnet coupling portion 328. With this configuration, the second core 380a3 may increase a mass of the rotor 260a3 without generating an unbalanced rotation force when the rotor 260a3 rotates, thereby increasing a rotational inertia of the rotor 260a3. Accordingly, operation efficiency of the compressor may be improved.

Figure 21:
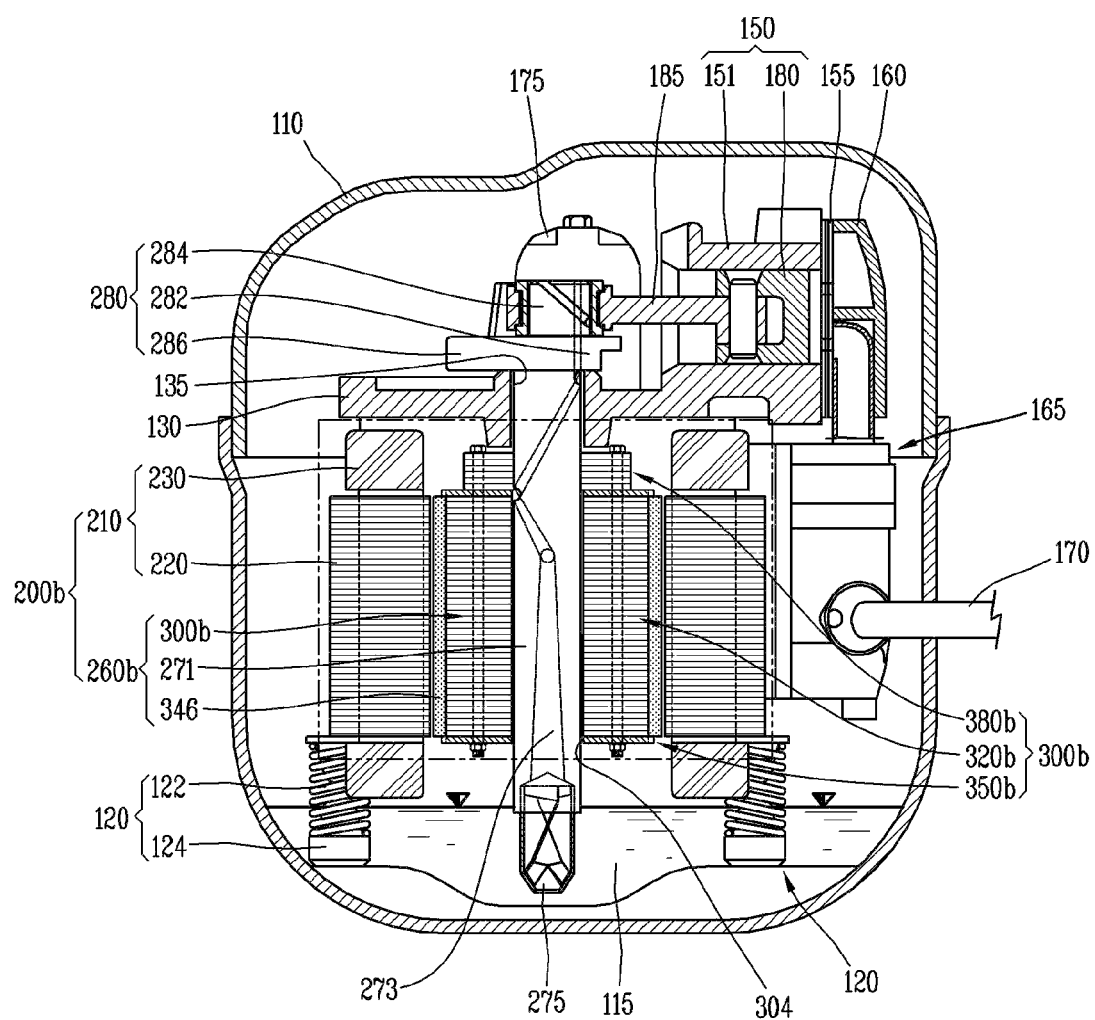
FIG. 21 is a sectional view of a compressor having an electric motor in accordance with still another embodiment.
Figure 22:
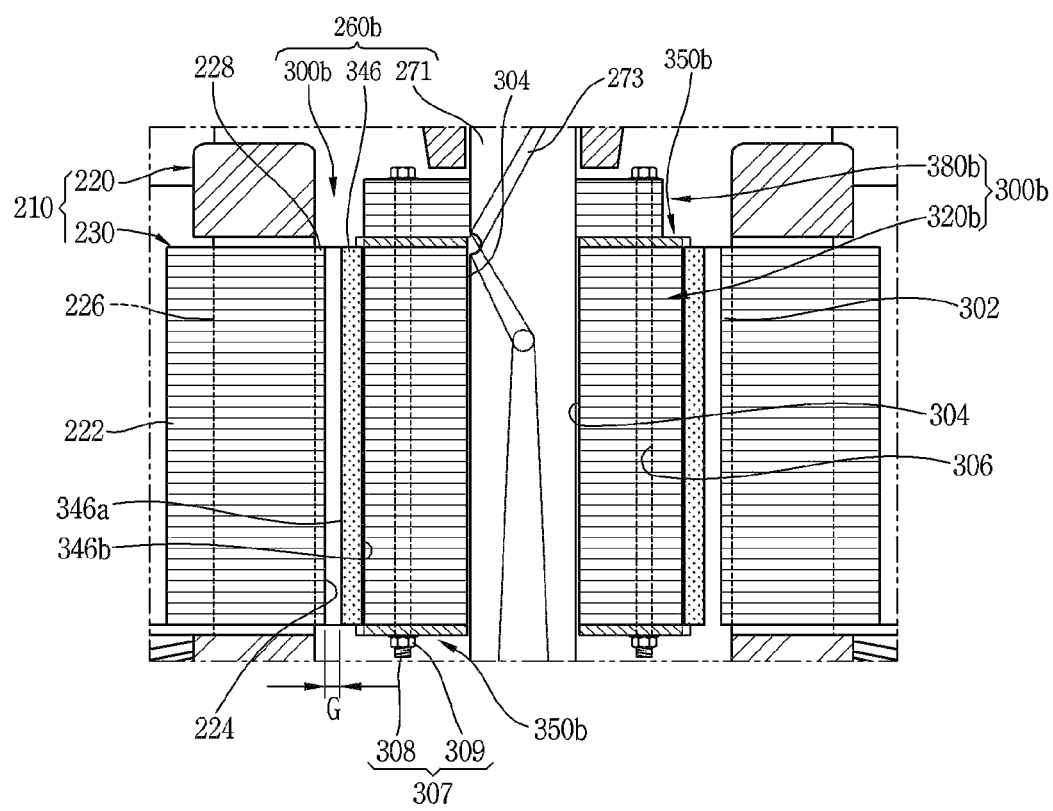
FIG. 22 is an enlarged view of a main portion of the electric motor of FIG. 21.
Figure 23:
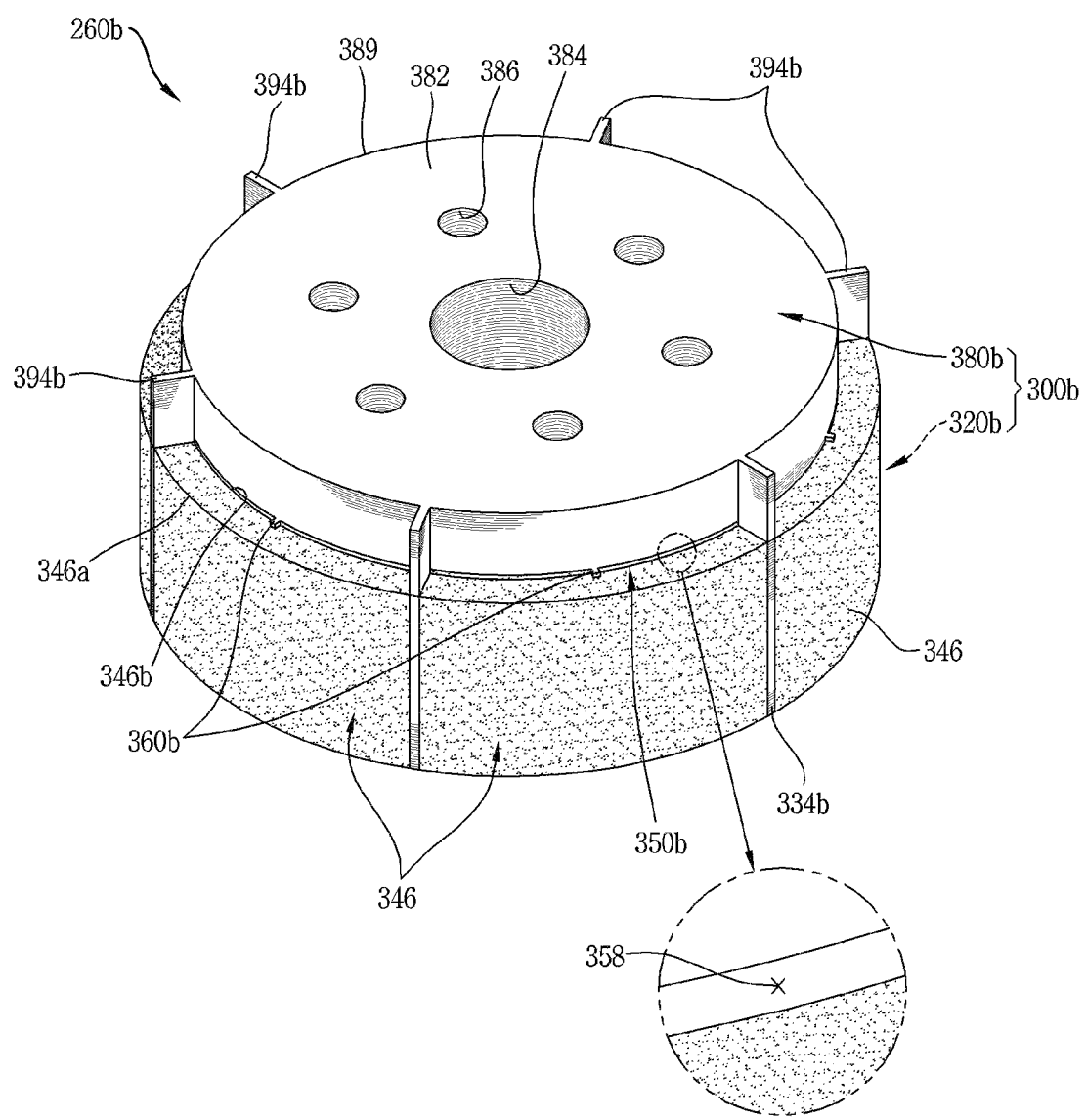
FIG. 23 is a perspective of a rotor of FIG. 22.
Figure 24:
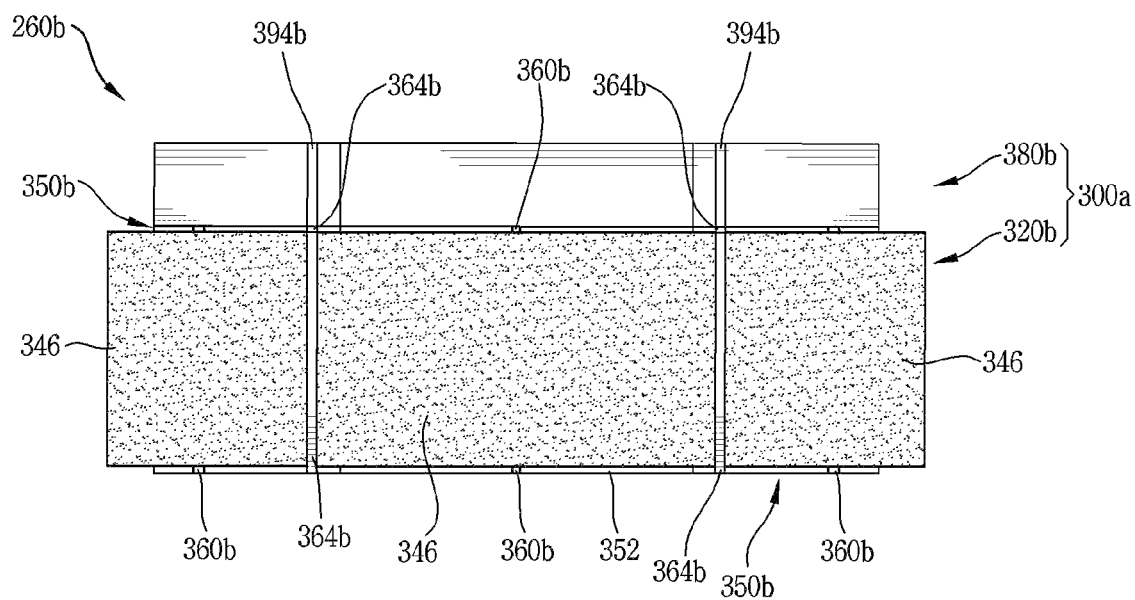
FIG. 24 is a lateral view of FIG. 23.

FIG. 21 is a cross-sectional view of a compressor having an electric motor in accordance with still another embodiment. FIG. 22 is an enlarged view of a main portion of the electric motor of FIG. 21. FIG. 23 is a perspective of a rotor of FIG. 22. FIG. 24 is a lateral view of FIG. 23. As illustrated in FIGS. 21 to 24, the compressor of this embodiment may include case 110, compression unit 150, and electric motor 200b.

The case 110 may have a hermetic accommodating space therein. The compression unit 150 may be located at an inner upper portion of the case 110. The electric motor 200*b* may be located at a lower side of the compression unit 150.

The compression unit 150 may have cylinder 151, piston 180 disposed inside of the cylinder 151, and connecting rod 185 connected to the piston 180.

The electric motor 200*b* may include stator 210, and rotor 260*b* rotatably disposed with respect to the stator 210 so that the rotor 260*b* is received with a predetermined air gap G therebetween. The rotor 260*b* may include rotational shaft 271, rotor core 300*b* coupled to the rotational shaft 271, and permanent magnets 346 coupled to the rotor core 300*b*.

The permanent magnet 346 may be made of a rare earth magnet. The permanent magnet 346 may be made of a neodymium (Nd) magnet. The permanent magnet 346 may be implemented in an arcuate shape. The permanent magnets 346 may be coupled to an outer circumferential surface of the rotor core 300*b*.

The rotor core 300*b* may include first core 320*b* to which the permanent magnets 346 may be coupled, and second core 380*b* made of a magnetic material and coupled to an end portion or end of the first core 320*b* in an axial direction.

The permanent magnet 346 may have outer surface 346*a* and inner surface 346*b* spaced apart in a radial direction of the first core 320*b*. In this embodiment, as the permanent magnets 346 are coupled to an outer circumference of the first core 320*b*, the second core 380*b* may have a configuration identical to that of the first core 320*b*.

Figure 25:
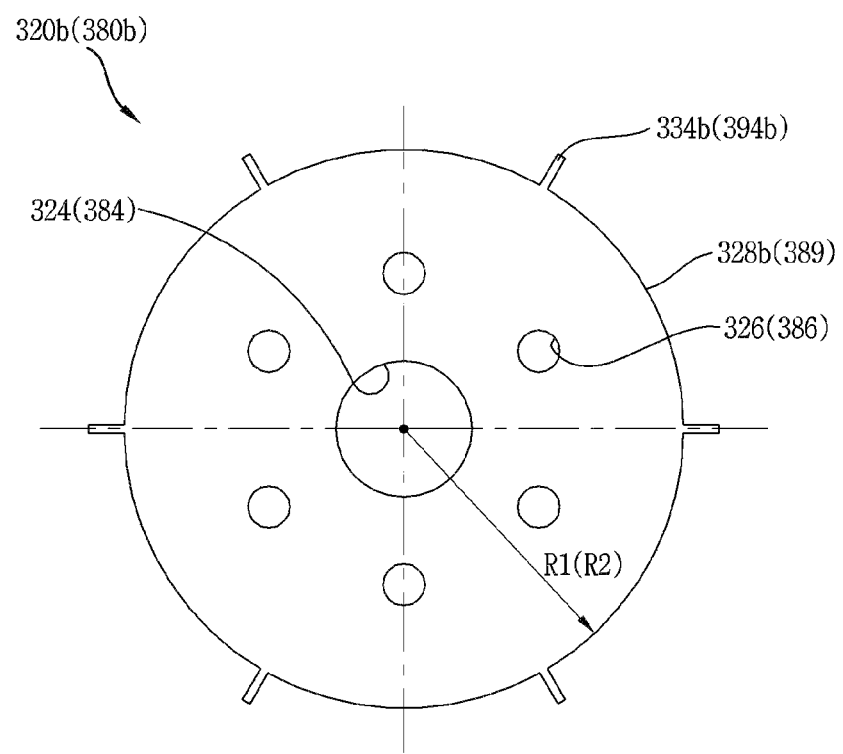
FIG. 25 is a planar view of a first core of FIG. 23.

FIG. 25 is a planar view of the first core of FIG. 23. As illustrated in FIG. 25, the first core 320*b* may be configured by stacking substantially disk-shaped electrical sheets in an insulated manner. A rotational shaft hole 324 may be formed through a center of the first core 320*b* so that the rotational shaft 271 may be inserted therethrough. A plurality of penetrating portions 326 may penetrate around the rotational shaft hole 324.

First ribs 334*b* may be disposed on both sides of the permanent magnet 346 in a radial direction on an outer circumferential surface of the first core 320*b*. Each of the permanent magnet coupling portions 328*b* may be located between the first ribs 334*b* so that each of the permanent magnets 346 may be coupled thereto.

Referring to FIGS. 23 and 25 together, the second core 380*b* may be configured by stacking disk-shaped electrical sheets in an insulated manner. The second core 380*b* may have outer surfaces 389 disposed inside of extension lines that extend axially from inner surfaces of the permanent magnets 346. As each of the outer surfaces 389 is cut in an arcuate shape, the outer surface may be referred to as an "arcuate cutout portion". Rotational shaft hole 384 may be formed through the second core 380*b* so that the rotational shaft 271 may be inserted therethrough. The second core 380*b* may include a plurality of penetrating portions 386 formed around a circumference of the rotational shaft hole 384.

A radial length R2 to the outer surface 389 of the second core 380*b* in a region adjacent to the permanent magnet 346 may be equal to a radial length R1 to a permanent magnet coupling portion 328*b*. In this embodiment, it is illustrated that the radial length R2 is equal to the radial length R1; however, this is only an example, and the radial length R2 may be shorter than the radial length R1.

Figure 26:
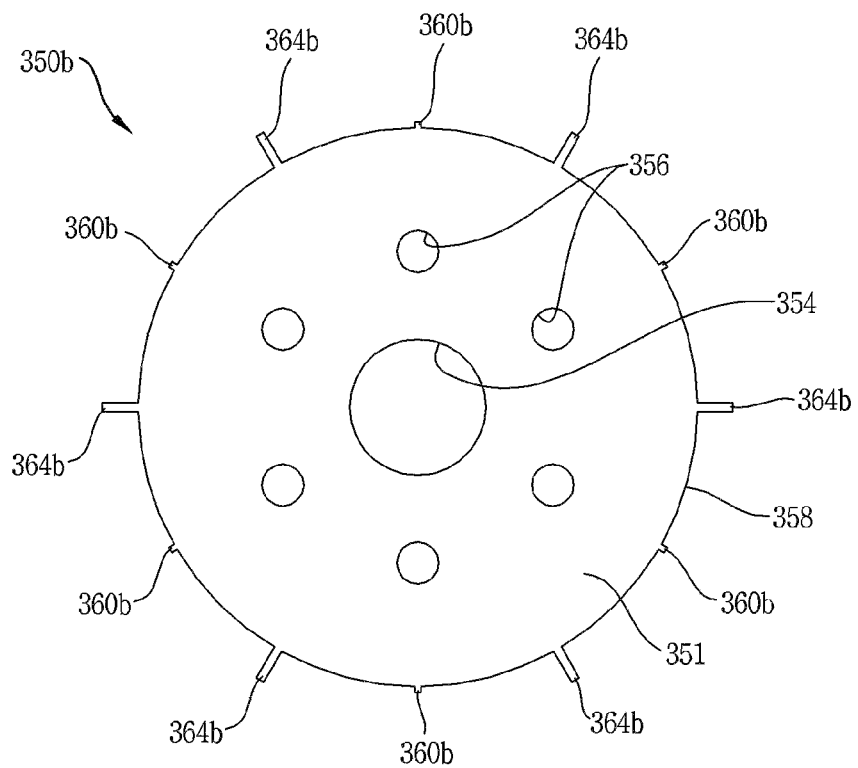
FIG. 26 is a planar view of an axial separation prevention member of FIG. 23.

FIG. 26 is a planar view of an axial separation prevention member of FIG. 23. As illustrated in FIG. 26, axial separation prevention member 350*b* may have body 351 provided with outer surfaces (empty space portions or spaces 358) corresponding to outer surfaces of the first core 320*b* in the circumferential direction and third ribs 364*b* corresponding to the first ribs 334*b*, and end surface contact portions 360*b* that protrude outwardly from the outer surfaces of the body 351 to contact axial end surfaces of the permanent magnets 346. The axial separation prevention member 350*b* may be made of the same material same as that of the first core 320*b* and the second core 380*b*.

With this configuration, each of the permanent magnets 346 may be coupled to the permanent magnet coupling portions 328*b* disposed at the circumferential surface of the first core 320*b*, and the each of axial separation prevention members 350*b* may be disposed at both end portions or ends of the first core 320*b* in an axial direction. The second core 380*b* may be disposed on or at an upper side of the first core 320*b* with being extended in the axial direction. The first core 320*b*, the axial separation prevention member 350*b*, and the second core 380*b* may be integrally coupled by the coupling member 307.

When starting an operation to apply power to the stator, the rotor 260*b* may be rotated centering on the rotational shaft 271 in response to an interaction between a magnetic field formed by the stator coil and a magnetic field of the permanent magnets 346. The axial separation prevention member 350*b* may be disposed inside of the extension lines that extend in the axial direction from the inner surfaces of the permanent magnets 346, thereby suppressing magnetic flux leakage at end surfaces of the permanent magnets 346.

An operation efficiency of the compressor may be improved as a mass of the rotor 260*b* is increased by the second core 380*b*, thereby increasing a rotational inertia. In addition, vibration may be suppressed when the rotor 260*b* rotates.

Figure 27:
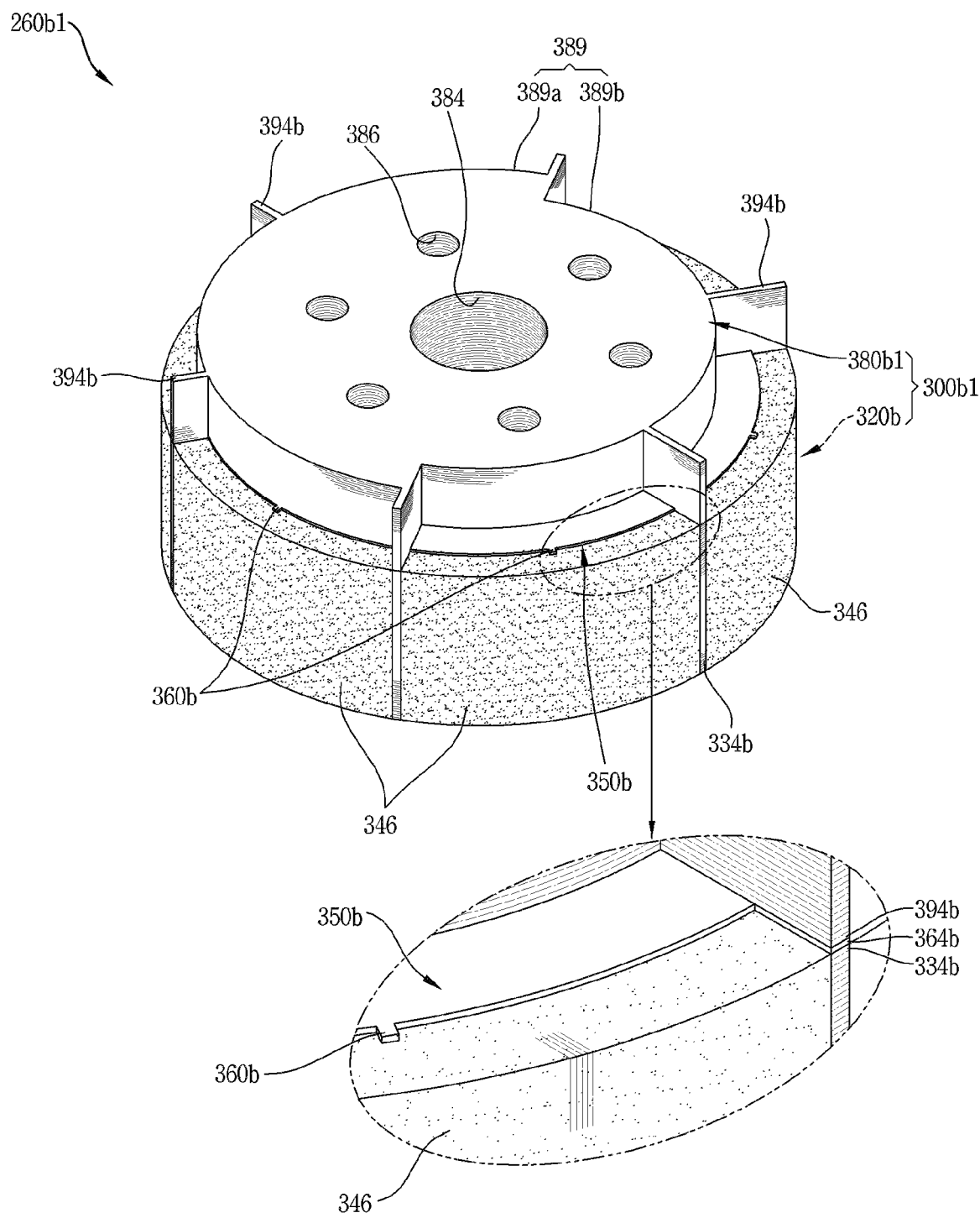
FIG. 27 is a modified example of the rotor of FIG. 23.
Figure 28:
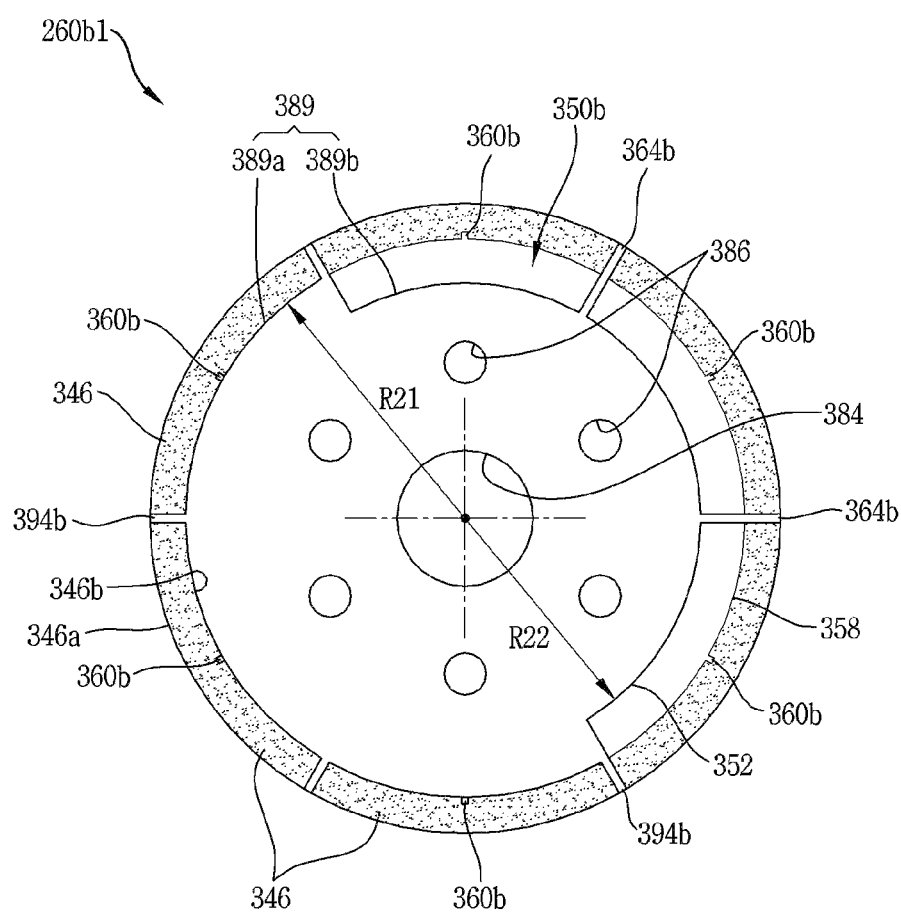
FIG. 28 is a planar view of a second core of FIG. 27.

FIG. 27 is a modified example of the rotor of FIG. 23. FIG. 28 is a planar view of the second core of FIG. 27. The rotor 260*b*1 of the electric motor of this embodiment may include rotational shaft 271, rotor core 300*b*1, and permanent magnets 346.

As illustrated in FIG. 27, the rotor core 300*b*1 may include first core 320*b* to which the permanent magnets 346 may be coupled, and second core 380*b*1 made of a magnetic material and coupled to an end portion or end of the first core 320*b* in an axial direction. Each of the permanent magnets 346 may have an arcuate cross-section. The permanent magnets 346 may be implemented as, for example, 6 pieces.

Permanent magnet coupling portions 328*b* may be formed at outer surfaces of the first core 320*b* so that the permanent magnets 346 may be coupled thereto. First ribs 334*b* protruding outwardly in the radial direction may be located on the outer surfaces of the first core 320*b*. The first core 320*b* may have rotational shaft hole 324 and a plurality of penetrating portions 326.

The axial separation prevention members 350*b* may be disposed at both end portions or ends of the first core 320*b*. The axial separation prevention member 350*b* may have a rotational shaft hole 354 and a plurality of penetrating portions 356. The axial separation prevention member 350*b* may have an empty space portion or space 358 cut out corresponding to an end surface of the permanent magnet 346. The axial separation prevention member 350*b* may include third ribs 394 corresponding to the first ribs 334. The axial separation prevention member 350*b* may include end surface contact portion 360*b* contacting the axial end surface of the permanent magnet 346. Accordingly, axial separation of the permanent magnet 346 may be suppressed. The end surface contact portion 360*b* may protrude from the empty space portion 358 in the radial direction.

As illustrated in FIG. 28, the second core 380*b*1 may have outer surfaces 389 disposed inside of extension lines that extend axially from inner surfaces of the permanent magnets 346.

Each of the first core 320*b*, the axial separation prevention member 350*b*, and the second core 380*b*1 may be made of electrical sheets of the same material.

Second ribs 394*b* may be provided corresponding to the first ribs 334*b* of the first core 320*b*. The second ribs 394*b* may be axially aligned with the first ribs 334*b* of the first core 320*b* and the third ribs 364*b* of the axial separation prevention member. Each end of the first ribs 334*b*, the second ribs 394*b*, and the third ribs 364*b* may contact a circumference of a diameter identical to one another.

Outer surfaces of the second core 380*b*1 may be formed asymmetrically so that an unbalanced force is generated in one direction during rotation. The outer surfaces 389 of the second core 380*b*1 may have first arcuate cutout portions or cutouts 389*a* cut to correspond to extension lines extending axially from the inner surfaces of the permanent magnets 346, and second arcuate cutout portions or cutouts 389*b* each having an outer surface cut to be close to a center of the second core 380*b*1 formed by further cutting out the outer surface thereof than the first arcuate cutout portions 389*a*.

A radial length R21 of the first arcuate cutout portion 389*a*, that is, to the outer surface 389 of the second core 380*b*1 in a region adjacent to the permanent magnet 346 may be equal to the radial length R1 to the permanent magnet coupling portion 328. A radial length R22 of the second arcuate cutout portion 389*b*, that is, to the outer surface 389 of the second core 380*b*1 in a region adjacent to the permanent magnet 346 may be shorter than the radial length R1 to the permanent magnet coupling portion 328. The second arcuate cutout portion 389*b* may face the first arcuate cutout portion 389*a* based on a center of the second core 380*b*1. The second arcuate cutout portion 389*b* may have a reduced radius R22 compared to a radius R21 of the first arcuate cutout portion 389*a*.

The second core 380*b*1 may be formed by stacking electrical sheets having the first arcuate cutout portions 389*a* and the second arcuate cutout portions 389*b* in an insulated manner. The second core 380*b*1 may be configured by aligning the first arcuate cutout portions 389*a* and the second arcuate cutout portions 389*b* in the axial direction.

The second core 380*b*1 may be configured by alternately arranging the first arcuate cutout portions 389*a* and the second arcuate cutout portions 389*b* in the axial direction. The second core 380*b*1 may be configured by stacking a preset number of stacked units in a manner that a plurality of electrical sheets having the first arcuate cutout portions 389*a* and the second arcuate cutout portions 389*b* are alternately arranged in the axial direction.

Embodiments disclosed herein provide an electric motor having a rotor and a compressor having an electric motor capable of suppressing a magnetic flux leakage and increasing rotational inertia. Embodiments disclosed herein further provide an electric motor having a rotor and a compressor having an electric motor capable of increasing rotational inertia and simplifying an assembly process. In addition, embodiments disclosed herein provide an electric motor and a compressor having the same capable of sharing a mold of a rotor having an unbalanced force during rotation and a mold of a rotor not having an unbalanced force during rotation.

Embodiments disclosed herein provide an electric motor and a compressor having an electric motor capable of improving an efficiency of the compressor by increasing rotational inertia. In addition, embodiments disclosed herein provide an electric motor and a compressor having an electric motor capable of increasing rotational inertia regardless of a coupling position of a permanent magnet of a rotor.

An electric motor according to embodiments disclosed herein has solutions for the above problems by coupling a permanent magnet to a first core of a rotor and disposing a second core made of a magnetic material so as not to be coupled to the permanent magnet at an end portion or end of the first core. More specifically, by disposing the second core inside of an extension line extending axially from an inner surface of the permanent magnet, a rotational inertia of the rotor may be increased and a magnetic flux leakage of the permanent magnet may be suppressed.

The electric motor may include a stator, and a rotor provided with a rotational shaft, a rotor core coupled to the rotational shaft, and permanent magnets coupled to the rotor core. The rotor core may include a first core to which the permanent magnets may be coupled, and a second core made of a magnetic material and coupled to an end portion or end of the first core in an axial direction. Each of the permanent magnets may have an outer surface and an inner surface spaced apart in a radial direction. The second core may include outer surfaces disposed on an outer side in the radial direction, and at least a portion of the outer surfaces of the second core may be disposed inside of extension lines extending in the axial direction from the inner surfaces of the permanent magnets.

Each of the permanent magnets may have a shape with a rectangular cross-section, and be disposed to be spaced apart from each other in a circumferential direction of the first core. The first core is provided with permanent magnet coupling portions formed through in the axial direction so that the permanent magnets may be inserted therein.

The first core may include flux barriers formed through both sides of the permanent magnet in the circumferential direction of the first core, and first ribs each disposed between the flux barriers extending in a radial direction of the first core to contact a circumference of the first core. The flux barriers extending in a circumferential direction may be located at both ends of the permanent magnet coupling portion, and the flux barriers may be spaced apart in the circumferential direction.

The first rib may be located between the flux barriers adjacent to each other.

The second core may have second ribs corresponding to the first ribs of the first core. The outer surfaces of the second core may correspond to inner surfaces of the permanent magnet coupling portions and inner surfaces of the flux barriers, and include the second ribs aligned in the axial direction with the first ribs of the first core. The second ribs may protrude in the radial direction to contact a circumference with a diameter same as a circumference of the first core.

The second core may be provided with first linear cutout portions formed by linearly cutting out the outer surfaces thereof to correspond to inner surfaces of permanent magnet coupling portions and inner surfaces of the flux barriers. The first linear cutout portion of the second core may be located between the second ribs that are adjacent to each other.

The permanent magnets may be arranged in even numbers in a circumferential direction of the first core.

The second core may include second linear cutout portions each having an outer surface cut to be close to a center of the second core formed by further cutting out the outer surface thereof than the first linear cutout portion, so that an unbalanced force is generated in one direction during rotation. As a result, as an unbalanced force may be generated when the rotor rotates, a use of a balance weight may be excluded or a size of the balance weight may be reduced.

The second core may be configured by stacking electrical steel plates (electrical sheets) each having the first linear cutout portions and the second linear cutout portions stacked in a manner that the first linear cutout portions and the second linear cutout portions are alternately arranged in the axial direction. Thereby, a mold of a rotor in which the unbalance force may be generated and a mold of a rotor in which the unbalance force is not generated may be shared.

The second core may include a plurality of stacked units formed by stacking a preset or predetermined number of electrical sheets each having the first linear cutout portions and the second linear cutout portions. The first linear cutout portions and the second linear cutout portions may be stacked to be alternately arranged in the axial direction in the second core.

An axial separation prevention member may be brought into contact with an end portion or end of the first core to suppress axial separation of the permanent magnet. The axial separation prevention member may include a body having outer surfaces that are linearly cut to correspond to inner surfaces of permanent magnet coupling portions and inner surfaces of flux barriers, and end surface contact portions that protrude outwardly from the outer surfaces of the body in a radial direction of the rotor core to contact end surfaces of the permanent magnets in the axial direction.

The axial separation prevention member may include outer surfaces cut to correspond to the first linear cutout portions in the circumferential direction and third ribs corresponding to the first ribs. The axial separation prevention member may be made of a magnetic material.

The second core may have arcuate cutout portions each having an outer surface cut to correspond to a circumference contacting an inner surface of a permanent magnet coupling portion disposed between the second ribs that are adjacent to each other. Lateral movement restraining portions contacting ends of the permanent magnet may be located in the permanent magnet coupling portion. The permanent magnet may be defined in an arcuate shape.

On an outer circumferential surface of the first core, first ribs may be disposed on both sides of the permanent magnet in a radial direction of the first core, and the second core may be provided with second ribs corresponding to the first ribs and protruding to contact extension lines extending in the axial direction from end portions of the first ribs.

An axial separation prevention member may be brought into contact with an end portion or end of the first core to suppress axial separation of the permanent magnets. The axial separation prevention member may include a body having outer surfaces cut to correspond to the outer surfaces of the first core in a circumferential direction and third ribs corresponding to the first ribs, and end surface contact portions that protrude outwardly from the outer surfaces of the body in a radial direction of the rotor core to contact end surfaces of the permanent magnets in the axial direction. The first core, the second core, and the axial separation prevention member may be made of the same material.

Outer surfaces of the second core may include first arcuate cutout portions formed by cutting out the outer surfaces thereof to correspond to extension lines extending in the axial direction from the inner surfaces of the permanent magnets, and second arcuate cutout portions each having an outer surface cut to be close to a center of the second core formed by more cutting out the outer surface thereof than the first arcuate cutout portions. The second core may be formed by stacking electrical sheets having the first arcuate cutout portions and the second arcuate cutout portions in the axial direction.

The second core may be configured such that electrical sheets having the first linear cutout portions and the second linear cutout portions are stacked in a manner that the first linear cutout portions and the second linear cutout portions are alternately arranged in the axial direction. The second core may be configured by stacking a plurality of stacked units formed by stacking a preset or predetermined number of electrical sheets each having the first linear cutout portions and the second linear cutout portions.

Embodiments disclosed herein further provide a compressor, including a case, a compression unit located inside of the case to compress refrigerant, and an electric motor disposed inside of the case to apply a drive force to the compression unit. The compression unit may include a cylinder, a piston disposed inside of the cylinder, and a connecting rod one or a first end of which is connected to the piston and another or a second end of which is connected to the electric motor.

Embodiments disclosed herein further provide with an electric motor including a stator, and a rotor provided with a rotational shaft, a rotor core coupled to the rotational shaft, and permanent magnets coupled to the rotor core. The rotor core may include a first core having permanent magnet coupling portions formed through the first core so that the permanent magnets may be inserted therein, and a second core stacked on an end portion or end of the first core. The second core may have outer surfaces each disposed on an outer side in a radial direction, and a radial length of the outer surface of the second core around a region adjacent to the permanent magnet is equal to or shorter than a radial length of the permanent magnet coupling portion.

As described above, according to embodiments disclosed herein, by providing a first core, and a second core located at an end portion or end of the first core, disposed inside of an extension line extending axially from an inner surface of the permanent magnet, and made of a metal material, a rotational inertia of the rotor may be increased and leakage of magnetic flux at an end portion side or end of the permanent magnet may be suppressed. In addition, as the rotational inertia of the rotor is increased, an efficiency of the compressor may be increased.

Further, as an axial length of the rotor is increased, a coupling force between a rotational shaft and a rotor core may be increased, and thereby suppressing vibration during rotation due to the increased rotational inertia. Furthermore, by providing second ribs contacting a circumference with a diameter same as a circumference of the first core, the first core and the second core may be assembled in a same assembly process, thereby simplifying an assembly process of the rotor.

By configuring the second core to include first linear cutout portions that are linearly cut to correspond to inner surfaces of permanent magnets, and second linear cutout portions each having an outer surface cut to be close to a center of the second core formed by more cutting out the outer surface thereof than the first linear cutout portions, the second core (or a mold) of a rotor having an unbalanced force during rotation and the second core (or a mold) of a rotor not having an unbalanced force during rotation may be shared.

In addition, a circumference of the second core contacts inner surfaces of the permanent magnets, so that the second core (or a mold) of a rotor (IPM rotor) in which the permanent magnets are inserted into the rotor core in an axial direction and the second core (or a mold) of a rotor (SPM rotor) in which the permanent magnets are coupled to an outer circumferential surface of the rotor core can be shared. In addition, as the second core is formed by stacking electrical sheets in an insulated manner, a magnitude of the rotational inertia of the rotor can be easily adjusted by adjusting the number of stacked electrical sheets.

In the foregoing, embodiments have been shown and described. However, embodiments may be embodied in various forms without departing from the spirit or essential characteristics thereof, and accordingly, it is intended that embodiments described above not be limited by the description provided herein.

Moreover, even if any embodiment is not specifically disclosed in the description, it should be broadly construed within the scope of the technical spirit, as defined in the accompanying claims. Further, all modifications and variations included within the technical scope of the claims and their equivalents should be covered by the accompanying claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electric motor, comprising:
   a stator; and
   a rotor provided with a rotational shaft, a rotor core coupled to the rotational shaft, and permanent magnets coupled to the rotor core, wherein the rotor core comprises:
   a first core to which the permanent magnets are coupled; and
   a second core made of a magnetic material and coupled to an end of the first core in an axial direction, wherein each of the permanent magnets has an outer surface and an inner surface spaced apart from each other in a radial direction, wherein the second core has outer surfaces disposed at an outer side in the radial direction, and at least a portion of the outer surfaces of the second core is disposed inside of an extension line extending in the axial direction from the inner surface of the permanent magnet, wherein the first core is provided with first ribs on an outer circumferential surface thereof, which are disposed on both sides of the permanent magnet in the radial direction, wherein the second core is provided with second ribs corresponding to the first ribs and protruding to contact extension lines extending in the axial direction from ends of the first ribs, and wherein the second core comprises first arcuate cutouts formed by cutting out the outer surfaces thereof to correspond to extension lines extending in the axial direction from the inner surfaces of the permanent magnets, and second arcuate cutouts each having an outer surface cut to be close to a center of the second core formed by cutting out the outer surface thereof further than the first arcuate cutouts.

2. The electric motor of claim 1, further comprising at least one axial separation prevention member brought into contact with an end of the first core to suppress axial separation of the permanent magnets.

3. The electric motor of claim 2, wherein the at least one axial separation prevention member comprises:
a body having outer surfaces that are formed to correspond to inner surfaces of permanent magnet coupling portions; and
end surface contact portions that protrude outwardly from the outer surfaces of the body in the radial direction to contact end surfaces of the permanent magnets in the axial direction.

4. The electric motor of claim 2, wherein the at least one axial separation prevention member is made of a magnetic material.

5. The electric motor of claim 1, wherein each of the permanent magnets is defined in an arcuate shape.

6. The electric motor of claim 1, further comprising an axial separation prevention member brought into contact with an end of the first core to suppress axial separation of the permanent magnets.

7. The electric motor of claim 6, wherein the axial separation prevention member comprises:
a body having outer surfaces corresponding to the outer surfaces of the first core in a circumferential direction, and third ribs corresponding to the first ribs; and
end surface contact portions that protrude outwardly from the outer surfaces of the body in the radial direction to contact end surfaces of the permanent magnets in the axial direction.

8. The electric motor of claim 6, wherein the first core, the second core, and the axial separation prevention member are made of a same material.

9. A compressor, comprising:
a case;
a compression unit located inside of the case to compress a refrigerant; and
the electric motor of claim 1, disposed inside of the case to apply a drive force to the compression unit.

10. An electric motor, comprising:
a stator; and
a rotor provided with a rotational shaft, a rotor core coupled to the rotational shaft, and permanent magnets coupled to the rotor core, wherein the rotor core comprises:
a first core having permanent magnet coupling portions formed through the first core into which the permanent magnets are inserted; and
a second core stacked on an end of the first core, wherein the second core has outer surfaces disposed at an outer side in a radial direction, and wherein a radial length of the outer surfaces of the second core, in a region adjacent to the permanent magnets, is equal to or shorter than a radial length of the permanent magnet coupling portions, wherein each of the permanent magnets is defined in an arcuate shape, wherein the first core is provided with first ribs on an outer circumferential surface thereof, which are disposed on both sides of the permanent magnet in a radial direction of the first core, and wherein the second core is provided with second ribs corresponding to the first ribs and protruding to contact extension lines extending in the axial direction from ends of the first ribs, and wherein the second core comprises first arcuate cutouts formed by cutting out the outer surfaces thereof to correspond to extension lines extending in the axial direction from the inner surfaces of the permanent magnets, and second arcuate cutouts each having an outer surface cut to be close to a center of the second core formed by cutting out the outer surface thereof further than the first arcuate cutouts.

11. A compressor, comprising:
a case;
a compression unit located inside of the case to compress a refrigerant; and
the electric motor of claim 10, disposed inside of the case to apply a drive force to the compression unit.

* * * * *